United States Patent [19]
Hall et al.

[11] Patent Number: 5,920,861
[45] Date of Patent: Jul. 6, 1999

[54] TECHNIQUES FOR DEFINING USING AND MANIPULATING RIGHTS MANAGEMENT DATA STRUCTURES

[75] Inventors: Edwin J. Hall, San Jose, Calif.; Victor H. Shear, Bethesda, Md.; Luke S. Tomasello, San Jose, Calif.; David M. Van Wie, Sunnyvale, Calif.; Robert P. Weber, Menlo Park, Calif.; Kim Worsencroft, Los Gatos, Calif.; Xuejun Xu, Fremont, Calif.

[73] Assignee: InterTrust Technologies Corp., Sunnyvale, Calif.

[21] Appl. No.: 08/805,804

[22] Filed: Feb. 25, 1997

[51] Int. Cl.$^6$ ...................................................... G06F 17/30
[52] U.S. Cl. ................................. 707/9; 707/4; 707/102; 707/103
[58] Field of Search .................................. 707/9, 4, 102, 707/103

[56] References Cited

U.S. PATENT DOCUMENTS

| | | | |
|---|---|---|---|
| 3,573,747 | 4/1971 | Adams et al. | 705/37 |
| 3,609,697 | 9/1971 | Blevins | 395/702 |
| 3,796,830 | 3/1974 | Smith | 380/37 |
| 3,798,359 | 3/1974 | Feistel | 380/37 |
| 3,798,360 | 3/1974 | Feistel | 380/25 |
| 3,798,605 | 3/1974 | Feistel | 380/25 |
| 3,806,882 | 4/1974 | Clarke | 711/64 |
| 3,829,833 | 8/1974 | Freeny, Jr. | 340/825.31 |
| 3,906,448 | 9/1975 | Henriques | 235/438 |
| 3,911,397 | 10/1975 | Freeny, Jr. | 235/825.31 |
| 3,924,065 | 12/1975 | Freeny, Jr. | 375/274 |
| 3,931,504 | 1/1976 | Jacoby | 395/186 |

(List continued on next page.)

FOREIGN PATENT DOCUMENTS

| | | |
|---|---|---|
| 9 004 79 | 12/1984 | Belgium . |
| 0 84 441 | 7/1983 | European Pat. Off. . |
| 0128672 | 12/1984 | European Pat. Off. . |
| A0135422 | 3/1985 | European Pat. Off. . |
| 0180460 | 5/1986 | European Pat. Off. . |
| 0 370 146 | 11/1988 | European Pat. Off. . |
| 0399822A2 | 11/1990 | European Pat. Off. . |
| 0421409A2 | 4/1991 | European Pat. Off. . |
| 0 456 386 A2 | 11/1991 | European Pat. Off. . |
| 0 469 864 A2A3 | 2/1992 | European Pat. Off. . |
| 0 565 314 A2 | 10/1993 | European Pat. Off. . |

(List continued on next page.)

OTHER PUBLICATIONS

Applications Requirements for Innnovative Video Programming; How to Foster (or Cripple) Program Development Opportunities for Interactive Video Programs Delivered on Optical Media; A Challenge for the Introduction of DVD (Digital Video Disc) (Oct. 19–20, 1995, Sheraton Universal Hotel, Universal City CA).

Argent Information Q&A Sheet, http://www.digital–watermark.com/, Copyright 1995, The DICE Company, 7 pages.

Arneke, David, et al., New Release, AT&T, Jan. 9, 1995, AT&T encryption system protects information services, 1 page.

(List continued on next page.)

*Primary Examiner*—Wayne Amsbury
*Attorney, Agent, or Firm*—Finnegan, Henderson, Farabow, Garrett & Dunner LLP

[57] ABSTRACT

A descriptive data structure provides an abstract representation of a rights management data structure such as a secure container. The abstract representation may describe, for example, the layout of the rights management data structure. It can also provide metadata describing or defining other characteristics of rights management data structure use and/or processing. For example, the descriptive data structure can provide integrity constraints that provide a way to state rules about associated information. The abstract representation can be used to create rights management data structures that are interoperable and compatible with one another. This arrangement preserves flexibility and ease of use without compromising security.

101 Claims, 14 Drawing Sheets

U.S. PATENT DOCUMENTS

| | | | |
|---|---|---|---|
| 3,946,220 | 3/1976 | Brobeck et al. | 705/25 |
| 3,956,615 | 5/1976 | Anderson et al. | 380/24 |
| 3,958,081 | 5/1976 | Ehrsam et al. | 380/29 |
| 3,970,992 | 7/1976 | Boothroyd et al. | 380/29 |
| 4,048,619 | 9/1977 | Forman, Jr. et al. | 370/485 |
| 4,071,911 | 1/1978 | Mazur | 364/130 |
| 4,112,421 | 9/1978 | Freeny, jr. | 342/457 |
| 4,120,030 | 10/1978 | Johnstone | 380/4 |
| 4,163,280 | 7/1979 | Mori et al. | 711/207 |
| 4,168,396 | 9/1979 | Best | 380/4 |
| 4,196,310 | 4/1980 | Forman et al. | 380/46 |
| 4,200,913 | 4/1980 | Kuhar et al. | 341/23 |
| 4,209,787 | 6/1980 | Freeny, Jr. | 342/457 |
| 4,217,588 | 8/1980 | Freeny, Jr. | 342/458 |
| 4,220,991 | 9/1980 | Hamano et al. | 705/18 |
| 4,232,193 | 11/1980 | Gerard | 380/36 |
| 4,232,317 | 11/1980 | Freeny, Jr. | 342/464 |
| 4,236,217 | 11/1980 | Kennedy | 702/61 |
| 4,253,157 | 2/1981 | Kirschner et al. | 707/104 |
| 4,262,329 | 4/1981 | Bright et al. | 380/4 |
| 4,265,371 | 5/1981 | Desai et al. | 222/639 |
| 4,270,182 | 5/1981 | Asija | 704/8 |
| 4,278,837 | 7/1981 | Best | 380/4 |
| 4,305,131 | 12/1981 | Best | 345/327 |
| 4,306,289 | 12/1981 | Lumley | 380/4 |
| 4,309,569 | 1/1982 | Merkle . | |
| 4,319,079 | 3/1982 | Best . | |
| 4,323,921 | 4/1982 | Guillou . | |
| 4,328,544 | 5/1982 | Baldwin et al. . | |
| 4,337,483 | 6/1982 | Guillou . | |
| 4,361,877 | 11/1982 | Dyer et al. . | |
| 4,375,579 | 3/1983 | Davida et al. . | |
| 4,433,207 | 2/1984 | Best . | |
| 4,434,464 | 2/1984 | Suzuki et al. . | |
| 4,442,486 | 4/1984 | Mayer . | |
| 4,446,519 | 5/1984 | Thomas . | |
| 4,454,594 | 6/1984 | Heffron et al. . | |
| 4,458,315 | 7/1984 | Uchenick . | |
| 4,462,076 | 7/1984 | Smith, III . | |
| 4,462,078 | 7/1984 | Ross . | |
| 4,465,901 | 8/1984 | Best . | |
| 4,471,163 | 9/1984 | Donald et al. . | |
| 4,484,217 | 11/1984 | Block et al. . | |
| 4,494,156 | 1/1985 | Kadison et al. . | |
| 4,513,174 | 4/1985 | Herman . | |
| 4,528,588 | 7/1985 | Lofberg . | |
| 4,528,643 | 7/1985 | Freeny, Jr. . | |
| 4,553,252 | 11/1985 | Egendorf . | |
| 4,558,176 | 12/1985 | Arnold et al. . | |
| 4,558,413 | 12/1985 | Schmidt et al. . | |
| 4,562,306 | 12/1985 | Chou et al. . | |
| 4,562,495 | 12/1985 | Bond et al. . | |
| 4,577,289 | 3/1986 | Comerford et al. . | |
| 4,584,641 | 4/1986 | Guglielmino . | |
| 4,588,991 | 5/1986 | Atalla . | |
| 4,589,064 | 5/1986 | Chiba et al. . | |
| 4,593,353 | 6/1986 | Pickholtz . | |
| 4,593,376 | 6/1986 | Volk . | |
| 4,595,950 | 6/1986 | Lofberg . | |
| 4,597,058 | 6/1986 | Izumi et al. . | |
| 4,634,807 | 1/1987 | Chorley et al. . | |
| 4,644,493 | 2/1987 | Chandra et al. . | |
| 4,646,234 | 2/1987 | Tolman et al. . | |
| 4,652,990 | 3/1987 | Pailen et al. . | |
| 4,658,093 | 4/1987 | Hellman . | |
| 4,670,857 | 6/1987 | Rackman . | |
| 4,672,572 | 6/1987 | Alsberg . | |
| 4,677,434 | 6/1987 | Fascenda . | |
| 4,680,731 | 7/1987 | Izumi et al. . | |
| 4,683,553 | 7/1987 | Mollier . | |
| 4,685,056 | 8/1987 | Barnsdale et al. . | |
| 4,688,169 | 8/1987 | Joshi . | |
| 4,691,350 | 9/1987 | Kleijne et al. . | |
| 4,696,034 | 9/1987 | Wiedemer . | |
| 4,701,846 | 10/1987 | Ikeda et al. . | |
| 4,712,238 | 12/1987 | Gilhousen et al. . | |
| 4,713,753 | 12/1987 | Boebert et al. . | |
| 4,740,890 | 4/1988 | William . | |
| 4,747,139 | 5/1988 | Taaffe . | |
| 4,757,533 | 7/1988 | Allen et al. . | |
| 4,757,534 | 7/1988 | Matyas et al. . | |
| 4,768,087 | 8/1988 | Taub et al. . | |
| 4,791,565 | 12/1988 | Dunham et al. . | |
| 4,796,181 | 1/1989 | Wiedemer . | |
| 4,799,156 | 1/1989 | Shavit et al. . | |
| 4,807,288 | 2/1989 | Ugon et al. . | |
| 4,817,140 | 3/1989 | Chandra et al. . | |
| 4,823,264 | 4/1989 | Deming . | |
| 4,827,508 | 5/1989 | Shear . | |
| 4,858,121 | 8/1989 | Barber et al. . | |
| 4,864,494 | 9/1989 | Kobus . | |
| 4,868,877 | 9/1989 | Fischer . | |
| 4,903,296 | 2/1990 | Chandra et al. . | |
| 4,924,378 | 5/1990 | Hershey et al. . | |
| 4,930,073 | 5/1990 | Cina, Jr. | 395/726 |
| 4,949,187 | 8/1990 | Cohen . | |
| 4,977,594 | 12/1990 | Shear . | |
| 4,999,806 | 3/1991 | Chernow et al. . | |
| 5,001,752 | 3/1991 | Fischer . | |
| 5,005,122 | 4/1991 | Griffin et al. . | |
| 5,005,200 | 4/1991 | Fischer . | |
| 5,010,571 | 4/1991 | Katznelson . | |
| 5,023,907 | 6/1991 | Johnson et al. . | |
| 5,047,928 | 9/1991 | Wiedemer . | |
| 5,048,085 | 9/1991 | Abraham et al. . | |
| 5,050,213 | 9/1991 | Shear . | |
| 5,091,966 | 2/1992 | Bloomberg et al. . | |
| 5,103,392 | 4/1992 | Mori . | |
| 5,103,476 | 4/1992 | Waite et al. . | |
| 5,111,390 | 5/1992 | Ketcham . | |
| 5,119,493 | 6/1992 | Janis et al. . | |
| 5,128,525 | 7/1992 | Stearns et al. . | |
| 5,136,643 | 8/1992 | Fischer . | |
| 5,136,646 | 8/1992 | Haber et al. . | |
| 5,136,647 | 8/1992 | Haber et al. . | |
| 5,136,716 | 8/1992 | Harvey et al. . | |
| 5,146,575 | 9/1992 | Nolan, Jr. . | |
| 5,148,481 | 9/1992 | Abraham et al. . | |
| 5,155,680 | 10/1992 | Wiedemer . | |
| 5,168,147 | 12/1992 | Bloomberg . | |
| 5,185,717 | 2/1993 | Mori . | |
| 5,201,046 | 4/1993 | Goldberg et al. | 707/100 |
| 5,201,047 | 4/1993 | Maki et al. | 707/4 |
| 5,208,748 | 5/1993 | Flores et al. . | |
| 5,214,702 | 5/1993 | Fischer . | |
| 5,216,603 | 6/1993 | Flores et al. . | |
| 5,221,833 | 6/1993 | Hecht . | |
| 5,222,134 | 6/1993 | Waite et al. . | |
| 5,224,160 | 6/1993 | Paulini et al. . | |
| 5,224,163 | 6/1993 | Gasser et al. . | |
| 5,235,642 | 8/1993 | Wobber et al. . | |
| 5,245,165 | 9/1993 | Zhang . | |
| 5,247,575 | 9/1993 | Sprague et al. . | |
| 5,260,999 | 11/1993 | Wyman . | |
| 5,263,158 | 11/1993 | Janis . | |
| 5,265,164 | 11/1993 | Matyas et al. . | |
| 5,276,735 | 1/1994 | Boebert et al. . | |
| 5,280,479 | 1/1994 | Mary | 370/462 |
| 5,285,494 | 2/1994 | Sprecher et al. | 455/423 |
| 5,301,231 | 4/1994 | Abraham et al. . | |
| 5,311,591 | 5/1994 | Fischer . | |
| 5,319,705 | 6/1994 | Halter et al. . | |

| | | |
|---|---|---|
| 5,337,360 | 8/1994 | Fischer . |
| 5,341,429 | 8/1994 | Stringer et al. . |
| 5,343,527 | 8/1994 | Moore . |
| 5,347,579 | 9/1994 | Blandford . |
| 5,351,293 | 9/1994 | Michener et al. . |
| 5,355,474 | 10/1994 | Thuraisngham et al. ............. 707/9 |
| 5,373,561 | 12/1994 | Haber et al. . |
| 5,390,247 | 2/1995 | Fischer . |
| 5,390,330 | 2/1995 | Talati ................. 395/703 |
| 5,392,220 | 2/1995 | Van Den Hamer et al. ......... 364/488 |
| 5,392,390 | 2/1995 | Crozier ................. 345/335 |
| 5,394,469 | 2/1995 | Nagel et al. . |
| 5,410,598 | 4/1995 | Shear . |
| 5,412,717 | 5/1995 | Fischer . |
| 5,421,006 | 5/1995 | Jablon . |
| 5,422,953 | 6/1995 | Fischer . |
| 5,428,606 | 6/1995 | Moskowitz . |
| 5,438,508 | 8/1995 | Wyman . |
| 5,442,645 | 8/1995 | Ugon . |
| 5,444,779 | 8/1995 | Daniele . |
| 5,449,895 | 9/1995 | Hecht et al. . |
| 5,449,896 | 9/1995 | Hecht et al. . |
| 5,450,493 | 9/1995 | Maher . |
| 5,453,601 | 9/1995 | Rosen . |
| 5,453,605 | 9/1995 | Hecht et al. . |
| 5,455,407 | 10/1995 | Rosen . |
| 5,455,861 | 10/1995 | Faucher et al. . |
| 5,455,953 | 10/1995 | Russell . |
| 5,457,746 | 10/1995 | Dolphin . |
| 5,463,565 | 10/1995 | Cookson et al. . |
| 5,473,687 | 12/1995 | Lipscomb et al. . |
| 5,473,692 | 12/1995 | Davis . |
| 5,479,509 | 12/1995 | Ugon . |
| 5,485,622 | 1/1996 | Yamaki . |
| 5,491,800 | 2/1996 | Goldsmith et al. ............. 395/200.51 |
| 5,497,479 | 3/1996 | Hornbuckle . |
| 5,497,491 | 3/1996 | Mitchell et al. .............. 395/683 |
| 5,499,298 | 3/1996 | Narasimhalu et al. . |
| 5,504,757 | 4/1996 | Cook et al. . |
| 5,504,818 | 4/1996 | Okano . |
| 5,504,837 | 4/1996 | Griffeth et al. . |
| 5,508,913 | 4/1996 | Yamamoto et al. . |
| 5,509,070 | 4/1996 | Schull . |
| 5,513,261 | 4/1996 | Maher . |
| 5,530,235 | 6/1996 | Stefik et al. . |
| 5,530,752 | 6/1996 | Rubin . |
| 5,533,123 | 7/1996 | Force et al. . |
| 5,534,975 | 7/1996 | Stefik et al. . |
| 5,537,526 | 7/1996 | Anderson et al. ............. 707/515 |
| 5,539,735 | 7/1996 | Moskowitz . |
| 5,539,828 | 7/1996 | Davis . |
| 5,550,971 | 8/1996 | Brunner et al. ............. 707/3 |
| 5,553,282 | 9/1996 | Parrish et al. ............. 707/10 |
| 5,557,518 | 9/1996 | Rosen . |
| 5,563,946 | 10/1996 | Cooper et al. . |
| 5,568,552 | 10/1996 | Davis . |
| 5,572,673 | 11/1996 | Shurts ................. 395/186 |
| 5,592,549 | 1/1997 | Nagel et al. . |
| 5,606,609 | 2/1997 | Houser et al. . |
| 5,613,004 | 3/1997 | Cooperman et al. . |
| 5,621,797 | 4/1997 | Rosen . |
| 5,629,980 | 5/1997 | Stefik et al. . |
| 5,633,932 | 5/1997 | Davis et al. . |
| 5,634,012 | 5/1997 | Stefik et al. . |
| 5,636,292 | 6/1997 | Rhoads . |
| 5,638,443 | 6/1997 | Stefik . |
| 5,638,504 | 6/1997 | Scott et al. ............. 707/530 |
| 5,640,546 | 6/1997 | Gopinath et al. ............. 395/551 |
| 5,655,077 | 8/1997 | Jones et al. . |
| 5,687,236 | 11/1997 | Moskowitz et al. . |
| 5,689,587 | 11/1997 | Bender et al. . |
| 5,692,180 | 11/1997 | Lee ................. 707/10 |
| 5,710,834 | 1/1998 | Rhoads ................. 382/232 |
| 5,740,549 | 4/1998 | Reilly et al. . |
| 5,745,604 | 4/1998 | Rhoads ................. 382/232 |
| 5,748,763 | 5/1998 | Rhoads ................. 382/115 |
| 5,748,783 | 5/1998 | Rhoads ................. 382/232 |
| 5,748,960 | 5/1998 | Fischer ................. 395/683 |
| 5,754,849 | 5/1998 | Dyer et al. . |
| 5,757,914 | 5/1998 | McManis ................. 380/23 |
| 5,758,152 | 5/1998 | LeTourneau ................. 395/701 |
| 5,765,152 | 6/1998 | Erickson ................. 707/9 |
| 5,768,426 | 6/1998 | Rhoads ................. 382/232 |

FOREIGN PATENT DOCUMENTS

| | | |
|---|---|---|
| 0 593 305 A2 | 4/1994 | European Pat. Off. . |
| 0 651 554 A1 | 5/1995 | European Pat. Off. . |
| 0 668 695 A2 | 8/1995 | European Pat. Off. . |
| 0 695 985 A1 | 2/1996 | European Pat. Off. . |
| 0 696 798 A1 | 2/1996 | European Pat. Off. . |
| 0715243A1 | 6/1996 | European Pat. Off. . |
| 0715244A1 | 6/1996 | European Pat. Off. . |
| 0715245A1 | 6/1996 | European Pat. Off. . |
| 0715246A1 | 6/1996 | European Pat. Off. . |
| 0715247A1 | 6/1996 | European Pat. Off. . |
| 0 725 376 | 8/1996 | European Pat. Off. . |
| 0749081A1 | 12/1996 | European Pat. Off. . |
| 0 778 513 A2 | 6/1997 | European Pat. Off. . |
| 0 795 873 A2 | 9/1997 | European Pat. Off. . |
| 3803982A1 | 1/1990 | Germany . |
| 57-726 | 5/1982 | Japan . |
| 62-241061 | 10/1987 | Japan . |
| 1-068835 | 3/1989 | Japan . |
| 64-68835 | 3/1989 | Japan . |
| 2-242352 | 9/1990 | Japan . |
| 2-247763 | 10/1990 | Japan . |
| 2-294855 | 12/1990 | Japan . |
| 4-369068 | 12/1992 | Japan . |
| 5-181734 | 7/1993 | Japan . |
| 5-257783 | 10/1993 | Japan . |
| 5-268415 | 10/1993 | Japan . |
| 6-175794 | 6/1994 | Japan . |
| 6-215010 | 8/1994 | Japan . |
| 6225059 | 8/1994 | Japan . |
| 7-056794 | 3/1995 | Japan . |
| 7-084852 | 3/1995 | Japan . |
| 7-141138 | 6/1995 | Japan . |
| 7-200317 | 8/1995 | Japan . |
| 7-200492 | 8/1995 | Japan . |
| 7-244639 | 9/1995 | Japan . |
| 8-137795 | 5/1996 | Japan . |
| 8-152990 | 6/1996 | Japan . |
| 8-185298 | 7/1996 | Japan . |
| A2136175 | 9/1984 | United Kingdom . |
| 2264796 | 9/1993 | United Kingdom . |
| 2294348 | 4/1996 | United Kingdom . |
| 2295947 | 6/1996 | United Kingdom . |
| WO A8502310 | 5/1985 | WIPO . |
| WO 85/03584 | 8/1985 | WIPO . |
| WO 90/02382 | 3/1990 | WIPO . |
| WO 92/06438 | 4/1992 | WIPO . |
| WO 92/22870 | 12/1992 | WIPO . |
| WO 93/01550 | 1/1993 | WIPO . |
| WO 94/01821 | 1/1994 | WIPO . |
| WO 94/03859 | 2/1994 | WIPO . |
| WO 94/06103 | 3/1994 | WIPO . |
| WO 9416395 | 7/1994 | WIPO . |
| WO 9418620 | 8/1994 | WIPO . |
| WO 94/22266 | 9/1994 | WIPO . |
| WO 94/27406 | 11/1994 | WIPO . |
| WO 96/00963 | 1/1996 | WIPO . |
| WO 96/03835 | 2/1996 | WIPO . |
| WO 96/05698 | 2/1996 | WIPO . |

| | | |
|---|---|---|
| WO 96/06503 | 2/1996 | WIPO . |
| WO 96/13013 | 5/1996 | WIPO . |
| WO 96/21192 | 7/1996 | WIPO . |
| WO 97/03423 | 1/1997 | WIPO . |
| WO97/07656 | 3/1997 | WIPO . |
| WO97/32251 | 9/1997 | WIPO . |
| WO 97/48203 | 12/1997 | WIPO . |

OTHER PUBLICATIONS

*AT&T Technology,* vol. 9, No. 4, New Products, Systems and Services, pp. 16–19.

Baggett, Claude, Cable's Emerging Role in the Information Superhighway, Cable Labs, 13 slides.

Barassi, Theodore Sedgwick, Esq., The Cybernotary: Public Key Registration and Certification and Authentication of International Legal Transactions, 4 pages.

Barnes, Hugh, memo to Henry LaMuth, subject: George Gilder articles, May 31, 1994.

Bart, Dan, Comments in the Matter of Public Hearing and Request for Comments on the International Aspects of the National Information Infrastructure, Aug. 12, 1994.

Baum, Michael, Worldwide Electronic Commerce: Law, Policy and Controls Conference, program details, Nov. 11, 1993.

Bisbey, II et al., Encapsulation: An Approach to Operating System Security, Oct. 1973, pp. 666–675.

Blom et al., Encryption Methods in Data Networks, Ericsson Technics, No. 2, 1978, Stockholm, Sweden.

Bruner, Rick E., PowerAgent, NetBot help advertisers reach Internet shoppers, Aug. 1997 (Document from Internet).

Cable Television and America's Telecommunications Infrastructure, National Cable Television Association, Apr. 1993.

Caruso, Technology, Digital Commerce 2 plans for watermarks, which can bind proof of authorship to electronic works, New York Times (Aug. 1995).

CD ROM, Introducing . . . The Workflow CD–ROM Sampler, Creative Networks, MCIMail: Creative Networks, Inc., Palo Alto, California.

Choudhury, et al., Copyright Protection for Electronic Publishing over Computer Networks, AT&T Bell Laboratories, Murray Hill, New Jersey 07974 (Jun. 1994).

Clark, Tim, Ad service gives cash back, www.new.com, Aug. 4, 1997, 2 pages (Document from Internet).

Codercard, Spec Sheet—Basic Coder Subsystem, No date given.

Communications of the ACM, Intelligent Agents, Jul. 1994, vol. 37, No. 7.

Communications of the ACM, Jun. 1996, vol. 39, No. 6.

Computer Systems Policy Project (CSSP), Perpsectives on the National Information Infrastructure: Ensuring Interoperability (Feb. 1994), Feb. 1994.

Cunningham, Donna, et al., News Release, AT&T, Jan. 31, 1995, AT&T, VLSI Technology join to improve info highway security, 3 pages.

Data Sheet, About the Digital Notary Service, Surety Technologies, Inc., 1994–95, 6 pages.

Dempsey, et al., *D–Lib Magazine, Jul./Aug. 1996* The Warwick Metadata Workshop: A Framework for the Deployent of Resource Description, Jul. 15, 1966.

Denning et al., Data Security, 11 Computing Surveys No. 3, Sep. 1979.

Diffie, Whitfield and Martin E. Hellman, IEEE Transactions on Information Theory, vol. 22, No. 6, Nov. 1976, New Directions in Cryptography, pp. 644–651.

Diffie, Whitfield and Martin E. Hellman, Proceedings of the IEEE, vol. 67, No. 3, Mar. 1979, Privacy and Authentication: An Introduction to Cryptography, pp. 397–427.

Digest of Papers, VLSI: New Architectural Horizons, Feb. 1980, Preventing Software Piracy With Crypto–Microprocessors, Robert M. Best, pp. 466–469.

DiscStore (Electronic Publishing Resources 1991).

Document from Internet, cgi@ncsa.uiuc.edu, CGI Common Gateway Interface, 1 page, 1996.

DSP56000/DSP56001 Digital Signal Processor User's Manual, Motorola, 1990, p. 2–2.

Dusse, Stephen R. and Burton S. Kaliski A Cryptographic Library for the Motorola 56000 in Damgard, I. M., Advances in Cryptology–Proceedings Eurocrypt 90, Springer–Verlag, 1991, pp. 230–244.

Dyson, Esther, Intellectual Value, Wired Magazine, Jul. 1995, pp. 136–141 and 182–184.

Effector Online vol. 6 No. 6, A Publication of the Electronic Frontier Foundation, 8 pages, Dec. 6, 1993.

EIA and TIA White Paper on National Information Infrastructure,published by the Electronic Industries Association and the Telecommunications Industry Association, Washington, D.C., no date.

Electronic Currency Requirements, XIWT (Cross Industry Working Group), no date.

Electronic Publishing Resources Inc. Protecting Electronically Published Properties Increasing Publishing Profits (Electronic Publishing Resources 1991).

*Firefly Network, Inc.,* www.ffly.com, What is Firefly? Firefly revision: 41.4 Copyright 1995, 1996.

First CII Honeywell Bull International Symposium on Computer Security and Confidentiality, Jan. 26–28, 1981, Conference Text, pp. 1–21.

Framework for National Information Infrastructure Services, Draft, U.S. Department of Commerce, Jul. 1994.

Framework for National Information Infrastructure Services, NIST, Jul. 1994, 12 slides.

Garcia, D. Linda, testimony before a hearing on science, space and technology, May 26, 1994.

Gleick, James, "Dead as a Dollar" *The New York Times Magazine,* Jun. 16, 1996, Section 6, pp. 26–30, 35, 42, 50, 54.

Green paper, Intellectual Property and the National Information Infrastructure, a Preliminary Draft on the Report of the Working Group on Intellectual Property Rights, Jul. 1994.

Greguras, Fred, Softic Symposium '95, Copyright Clearances and Moral Rights, Nov. 30, 1995 (as updated Dec. 11, 1995), 3 pages.

Guillou, L.: Smart Cards and Conditional Access, pp. 480–490 Advances in Cryptography, Proceedings of Euro-Crypt 84 (Beth et al, Ed., Springer–Verlag 1985).

Harman, Harry H., *Modern Factor Analysis,* Third Edition Revised, University of Chicago Press and London, Third revision published 1976.

Herzberg, Amir et al., Public Protection of Software, *ACM Transactions on Computer Systems,* vol. 5, No. 4, Nov. 1987, pp. 371–393.

Hofmann, Jud, Interfacing the NII to User Homes, Electronic Industries Association, Consumer Electronic Bus Committee, 14 slides, no date.

Holt, Stannie, Start–up promises user confidentiality in Web marketing service, *Info World Electric,* Aug. 13, 1997 (Document from Internet).

HOTJAVA™: The Security Story, 4 pages.

IBM Technical Disclosure Bulletin, Multimedia Mixed Object Envelopes Supporting a Graduated Fee Scheme via Encryption, vol. 37, No. 03, Mar. 1994, Armonk, NY.

IBM Technical Disclosure Bulletin, Transformer Rules for Software Distribution Mechanism–Support Products, vol. 37, No. 04B, Apr. 1994, Armonk, NY.

IISP Break Out Session Report for Group No. 3, Standards Development and Tracking System, no date.

Information Infrastructure Standards Panel: NII 'The Information Superhighway', Nations Bank—HGDeal—ASC X9, 15 pages.

Invoice? What is an Invoice? *Business Week,* Jun. 10, 1996.

Javasoft, Frequently Asked Questions—Applet Security, What's Java™? Products and Services, Java/Soft News, Developer's Cornier, Jun. 7, 1996, 8 pages.

Jiang, et al, A concept–Based Approach to Retrieval from an Electronic Industrialn Directory, *International Journal of Electronic Commerce,* vol. 1, No. 1, Fall 1996, pp. 51–72.

Jones, Debra, Top Tech Stories, PowerAgent Introducts Firs Internet 'Infomediary' to Empower and Protect Consumers, Aug. 13, 1997 3 pages (Document from Internet).

Kelly, Kevin, Whole Earth Review, E–Money, pp. 40–59, Summer 1993.

Kent, Protecting Externally Supplied Software In Small Computer (MIT/LCS/TR–255 Sep. 1980).

Kohntopp, M., Sag's durch die Blume, Apr. 1996, marit@schulung.netuse.de.

Kristol et al., Anonymous Internet Mercantile Protocol, AT&T Bell Laboratories, Murray Hill, New Jersey, Draft: Mar. 17, 1994.

Lagoze, Carl, *D–Lib Magazine, Jul./Aug. 1996,* The Warwick Framework, A Container Architecture for Diverse Sets of Metadata.

Lanza, Mike, electronic mail, George Gilder's Fifth Article—Digital Darkhorse—Newspapers, Feb. 21, 1994.

Levy, Steven, Wired, E–Money, That's What I Want, 10 pages, Dec. 1994.

Low et al., Anonymous Credit Cards and its Collusion Analysis, AT&T Bell Laboratories, Murray Hill, New Jersey, Oct. 10, 1994.

Low et al., Anonymous Credit Cards, AT&T Bell Laboratories, Proceedings fo the 2nd ACM Conference on Computer and Communications Security, Fairfax, Virginia, Nov. 2–4, 1994.

Low et al., Document Marking and Identification using both Line and Word Shifting, AT&T Bell Laboratories, Murray Hill, New Jersey, Jul. 29, 1994.

Maclachlan, Malcolm, PowerAgent Debuts Spam–Free Marketing, *TechWire,* Aug. 13, 1997, 3 pages (Document from Internet).

Maxemchuk, Electronic Document Distribution, AT&T Bell Laboratories, Murray Hill, New Jersey 07974.

Micro Card—Micro Card Technologies, Inc., Dallas, Texas, No date given.

Milbrandt, E., Stenanography Info and Archive, 1996.

Mori, Ryoichi and Masaji Kawahara, The Transactions of the EIEICE, V, Superdistribution: The Concept and the Architecture, E73 (Jul. 1990), No. 7, Tokyo, Japan.

Mossberg, Walter S., Personal Technology, Threats to Privacy On–Line Become More Worrisome, *Wall Street Journal,* Oct. 24, 1996.

Negroponte, Electronic Word of Mouth, *Wired* Oct. 1996, p. 218.

Negroponte, Nicholas, Telecommunications, Some Thoughts on Likely and expected Communications scenarios: A Rebutal, pp. 41–42, Jan. 1993.

Neumann, et al., A Provably Secure Operating System: The System, Its Applications, and Proofs, Computer Science Laboratory Report CSL–116, Second Edition, SRI International (May 1980).

New Release, Premenos Announces Templar 2.0—Next Generation Software for Secure Internet EDI, webmaster@templar.net, 1 page, Jan. 17, 1996.

New Release, *The Document Company Xerox,* Xerox Announces Software Kit for Creating Working Documents With Dataglyphs, Nov. 6, 1995, Minneapolis, MN, 13 pages.

News Release, The White House, Office of the President, Background on the Administration's Telecommunications Policy Reform Initiative, Jan. 11, 1994.

NII, Architecture Requirements, XIWT, no date.

Open System Environment Architectural Framework for National Information Infrastructure Services and Standards, in Support of National Class Distributed Systems, Distributed Systems Engineering Program Sponsor Group, Draft 1.0, Aug. 5, 1994.

Pelton, Dr. Joseph N., Telecommunications, Why Nicholas Negroponte is Wrong About the Future of Telecommunication, pp. 35–40, Jan. 1993.

Portland Software's Ziplock, Internet information, Copyright Portland Software 1996–1997, 12 pages.

PowerAgent Inc., Proper Use of Consumer Information on the Internet White Paper, Jun. 1997, Document from Internet, 9 pages (Document from Internet).

PowerAgent Press Releases, What the Experts are Reporting on PowerAgent, Aug. 13, 1997, 6 pages (Document from Internet).

PowerAgent Press Releases, What the Experts are Reporting on PowerAgent, Aug. 4, 1997, 5 pages (Document from Internet).

PowerAgent Press Releases, What the Experts are Reporting on PowerAgent, Aug. 13, 1997, 3 pages (Document from Internet).

Premenos Corp. White Paper: The Future of Electronic Commerce, A Supplement to Midrange Systems, Internet webmaster@premenos.com, 4 pages.

Press Release, National Semiconductor and EPR Partner For Information Metering/Data Security Cards (Mar. 4, 1994).

Rankine, G., Thomas—A Complete Single–Chip RSA Device, Advances in Cryptography, Proceedings of Crypto 86, pp. 480–487 (A.M. Odlyzko Ed., Springer–Verlag 1987).

Reilly, Arthur K., Standards committee T1–Telecommunications, Input to the 'International Telecommunications Hearings,' Panel 1: Component Technologies of the NII/GII, no date.

Resnick, et al., Recommender Systems,*Communications of the ACM,* vol. 40, No. 3, Mar. 1997,pp. 56–89.

*ROI* (Personal Library Software, 1987 or 1988).

ROI–Solving Critical Electronic Publishing Problems (Personal Library Software, 1987 or 1988).

Rose, Lance, Cyberspace and the Legal Matrix: Laws or Confusion?, 1991.

Rosenthal, Steve, New Media, Interactive Network: Views Get Involved, pp. 30–31, Dec. 1992.

Rosenthal, Steve, New Media, Interactive TV: The Gold Rush Is On, pp. 27–29, Dec. 1992.

Rosenthal, Steve, New Media, Mega Channels, pp. 36–46, Sep. 1993.

Rothstein, Edward, *The New York Times,* Technology, Connections, Making th eInternet come to you, through 'push' technology . . . pp. D5, Jan. 20, 1997.

Rutkowski, Ken, PowerAgent Introduces First Internet 'Infomediary' to Empower and Protect Consumers, *Tech Talk News Story,* Aug. 4, 1997 (Document from Internet).

Sager, Ira (Edited by), Bits & Bytes, *Business Week,* Sep. 23, 1996, p. 142E.

Schlossstein, Steven, International Economy, America: The G7's Comeback Kid, Jun./Jul. 1993.

Schurmann, Jurgen, *Pattern Classification, A Unified View of Statistical and Neural Approaches,* John Wiley & Sons, Inc., 1996.

Scnaumueller–Bichl et al., A Method of Software Protection Based on the Use of Smart Cards and Cryptographic Techniques, No date given.

Serving the Community: A Public–Interest Vision of the National Information Infrastructure, Computer Professionals for Social Responsibility, Executive Summary, no date.

Shear, Solutions for CD–ROM Pricing and Data Security Problems, pp. 530–533, *CD ROM Yearbook 1988–1989* (Microsoft Press 1988 or 1989).

Smith et al., Signed Vector Timestamps: A Secure Protocol for Partial Order Time, CMU–93–116, School of Computer Science Carnegie Mellon University, Pittsburgh, Pennsylvania, Oct. 1991; version of Feb. 1993.

Special Report, The Internet: Fulfilling the Promise The Internet: Bring Order From Chaos; Lynch, Clifford, Search the Internet; Resnick, Paul, Filtering Information on the Internet; Hearst, Marti A., Interfaces for Searching the Web; Stefik, Mark, Trusted Systems; *Scientific American,* Mar. 1997, pp. 49–56, 62–64, 68–72, 78–81.

Stefik, Internet Dreams: Archetypes, Myths, and Metaphors, Letting Loose the Light: Igniting Commerce in Electronic Publication, pp. 219–253, (1996) Massachusetts Institute of Technology.

Stefik, Mark, Introduction to Knowledge Systems, Chapter 7, Classification, pp. 543–607 (1995 by Morgan Kaufmann Publishers, Inc.

Stefik, Mark, Letting Loose the Light, Igniting Commerce in Electronic Publication, (1994, 1995) Palo Alto, California.

Stephenson, Tom, Advanced Imaging, The Info Infrastructure Initiative: Data SuperHighways and You, pp. 73–74, May 1993.

Sterling, Bruce, Literary freeware: Not for Commercial Use, remarks at Computers, Freedom and Privacy Conference IV, Chicago, Mar. 26, 1994.

Struif, Bruno The Use of Chipcards for Electronic Signatures and Encryption in: Proceedings for the 1989 Conference on VLSI and Computer Peripherals, IEEE Computer Society Press, 1989, pp. 4/155–4/158.

Suida, Karl, *Mapping New Applications Onto New Technologies,* Security Services in Telecommunications Networks, Mar. 8–10, 1988, Zurich.

Templar Overview: Premenos, Internet, *info@templar.net,* 4 pages.

Templar Software and Services: Secure, Reliable, Standards–Based EDI Over the Internet, Prementos, Internet *info@templar.net,* 1page.

The 1:1 Future of the Electronic Marketplace: Return to a Hunting and Gathering Society, 2 pages, no date.

The Benefits of ROI For Database Protection and Usage Based Billing (Personal Library Software, 1987 or 1988).

The New Alexandria No. 1, Alexandria Insitute, pp. 1–12, Jul.–Aug. 1986.

Tygar et al., Cryptography: It's Not Just For Electronic Mail Anymore, CMU–CS–93–107, School of Computer Science Carnegie Mellon University, Pittsburgh, Pennsylvania, Mar. 1, 1993.

Tygar et al., Dyad: A System for Using Physically Secure Coprocessors, School of Computer Science, Carnegie Mellon University, Pittsburgh, PA 15213 (undated).

Tygar et al., Dyad: A System for Using Physically Secure Coprocessors, School of Computer Science, Carnegie Mellon University, Pittsburgh, PA 15213 (May 1991).

Valovic T., Telecommunications, The Role of Computer Networking in the Emerging Virtual Marketplace, pp. 40–44.

Voight, Joan, Beyond the Banner, *Wired,* Dec. 1996, pp. 196, 200, 204.

Vonder Haar, Steven, PowerAgent Launches Commercial Service, *Inter@ctive Week,* Aug. 4, 1997 (Document from Internet).

Weber, Dr. Robert, Digital Rights Management Technologies, A Report to the International Federation of Reproduction Rights Organisations, Oct. 1995,pp. 1–49.

Weber, Dr. Robert, Digital Rights Managements Technologies, Oct. 1995, 21 pages.

Weber, Metering Technologies for Digital Intellectual Property, A Report to the International Federation of Reproduction Rights Organisations, pp. 1–29; Oct. 1994, Boston, MA, USA.

Weder, Adele, Life On The Infohighway, 4 pages, no date.

Weingart, Physical Security for the :Abyss System, IBM Thomas J. Watson Research Center, Yorktown Heights, New York 10598 (1987).

Weitzner, Daniel J., A Statement on EFF's Open Platform Campaign as Nov., 1993, 3 pages.

Wepin Store, Stenography (Hidden Writing) (Common Law 1995).

White, Abyss: A Trusted Architecture for Software Protection, IBM Thomas J. Watson Research Center, Yorktown Heights, New York 10598 (1987).

Wired 1.02, Is Advertising Really dead?, Part 2, 1994.

World Wide Web FAQ, How can I put an access counter on my home page?, 1 page, 1996.

XIWT Cross Industry Working Team, 5 pages, Jul. 1994.

Yee, Using Secure Coprocessors, CMU–CS–94–149, School of Computer Science, Carnegie Mellon University, Pittsburgh, PA15213.

Yellin, F. Low Level Security in Java, 8 pages.

Example Descriptive Data Structure

Fig. 2B Example Descriptive Data Structure
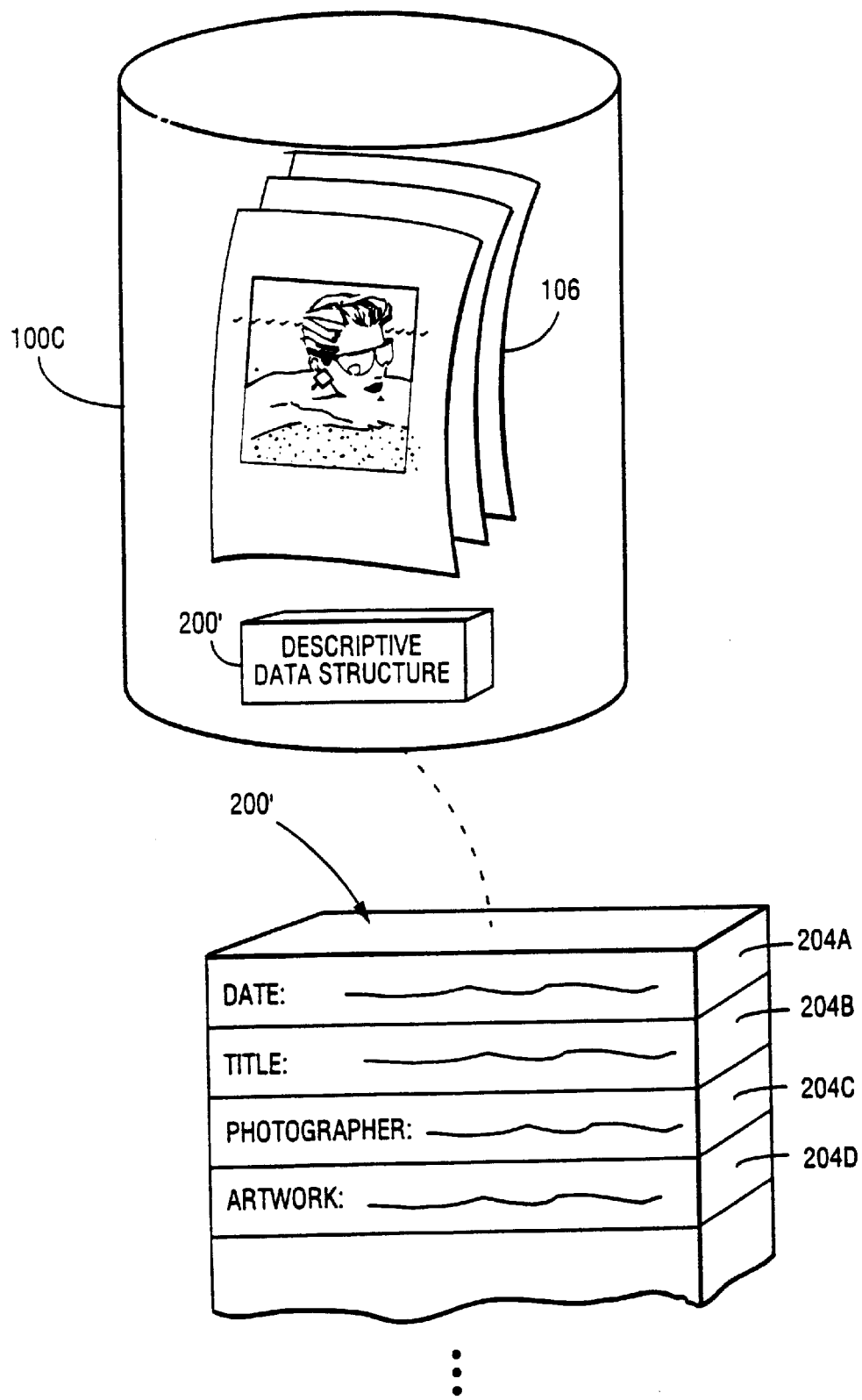

Example Creation Usage And Descriptive Data Structures

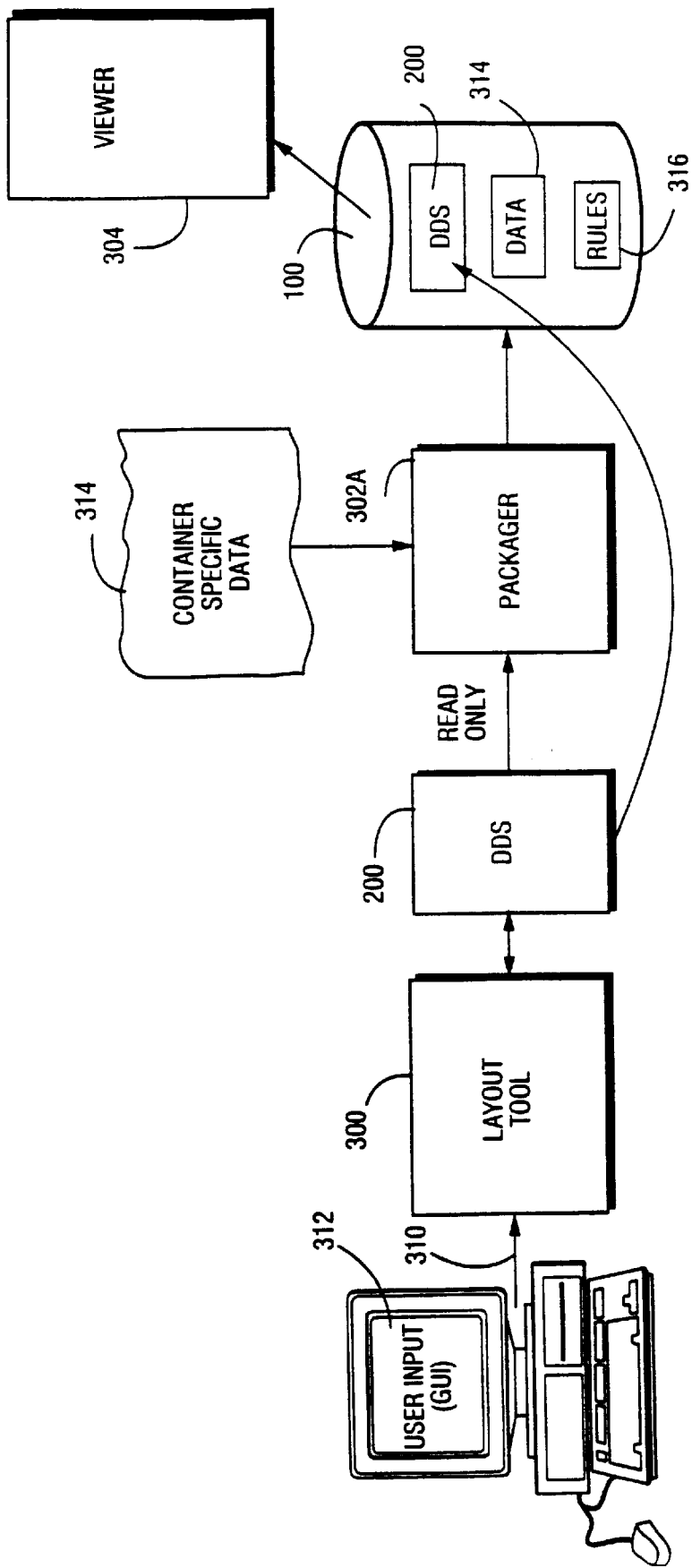
Fig. 4 Example Template Creation And Usage

Fig. 5 Example Secure System Architecture
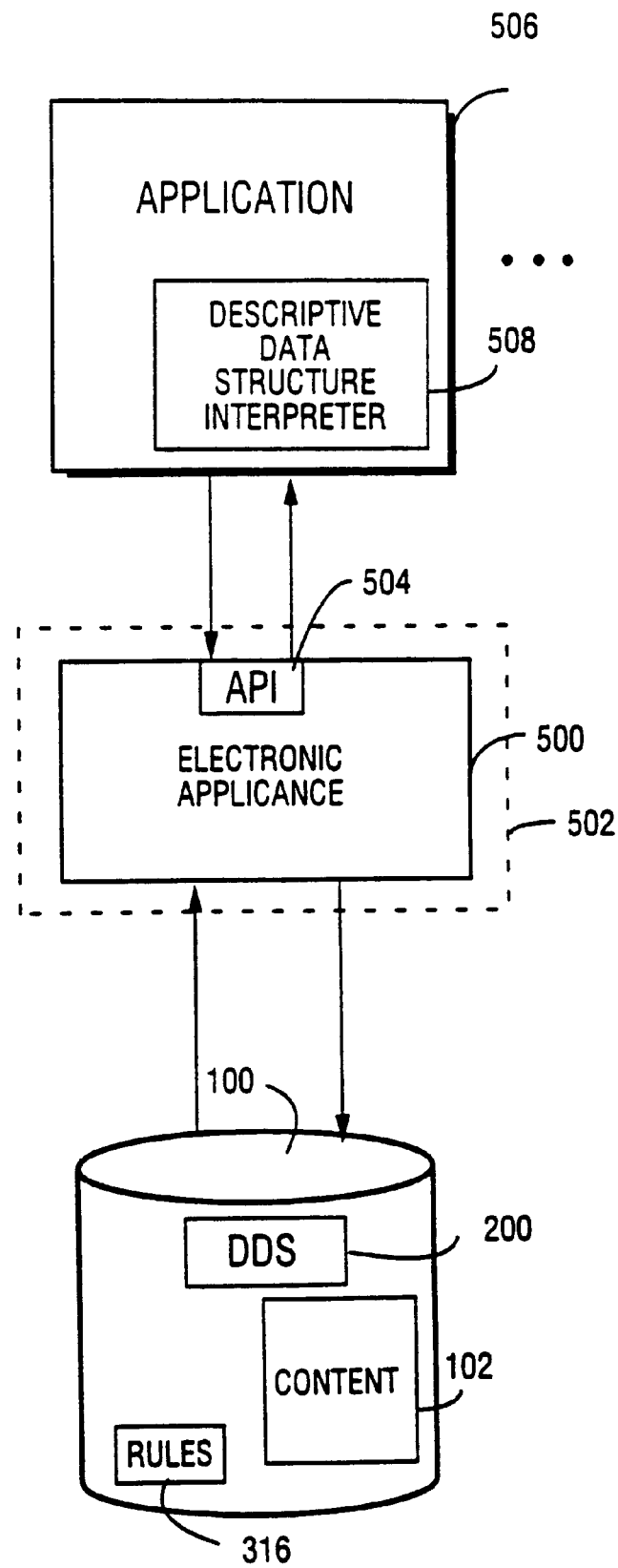

Example Detailed DDS Process

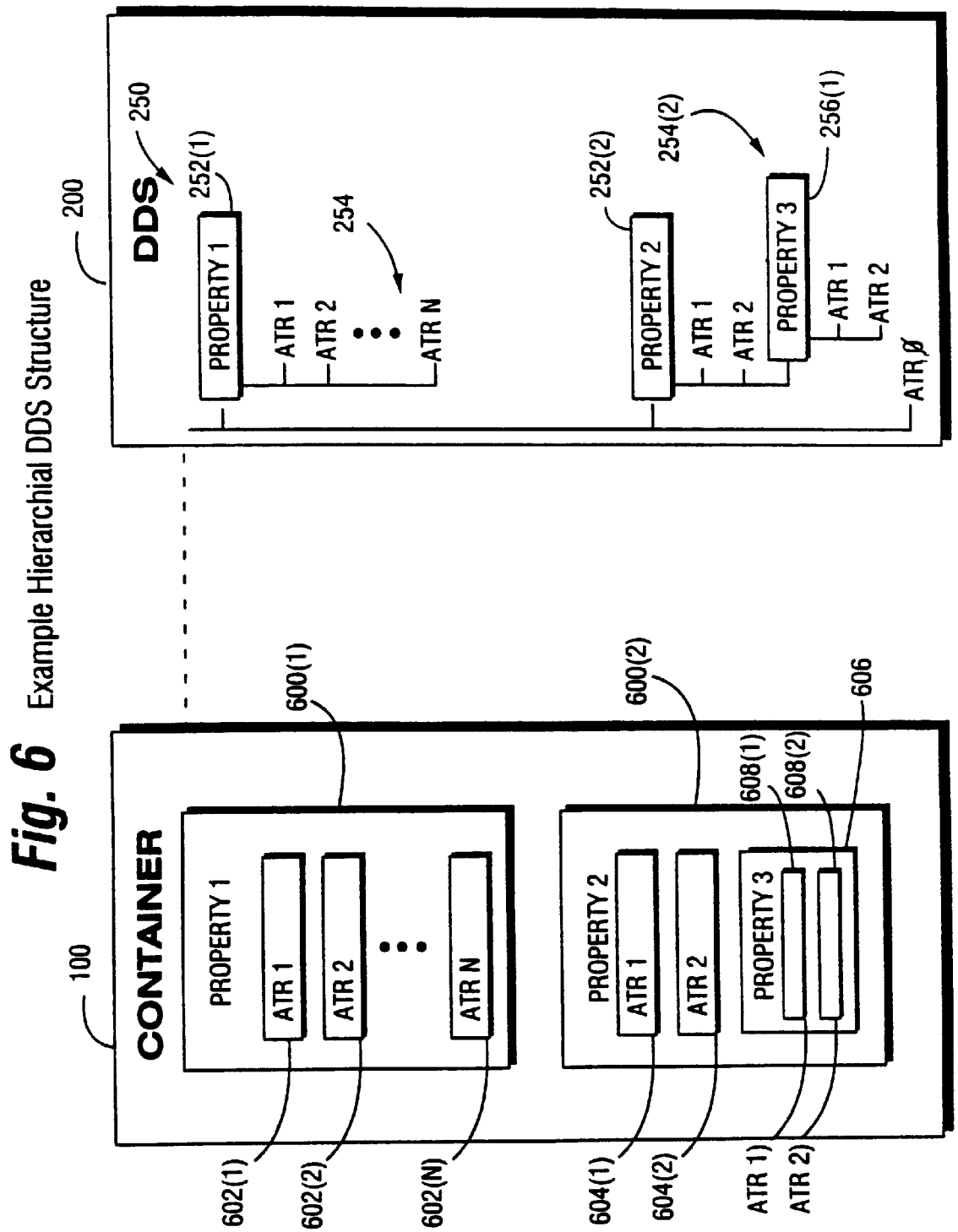

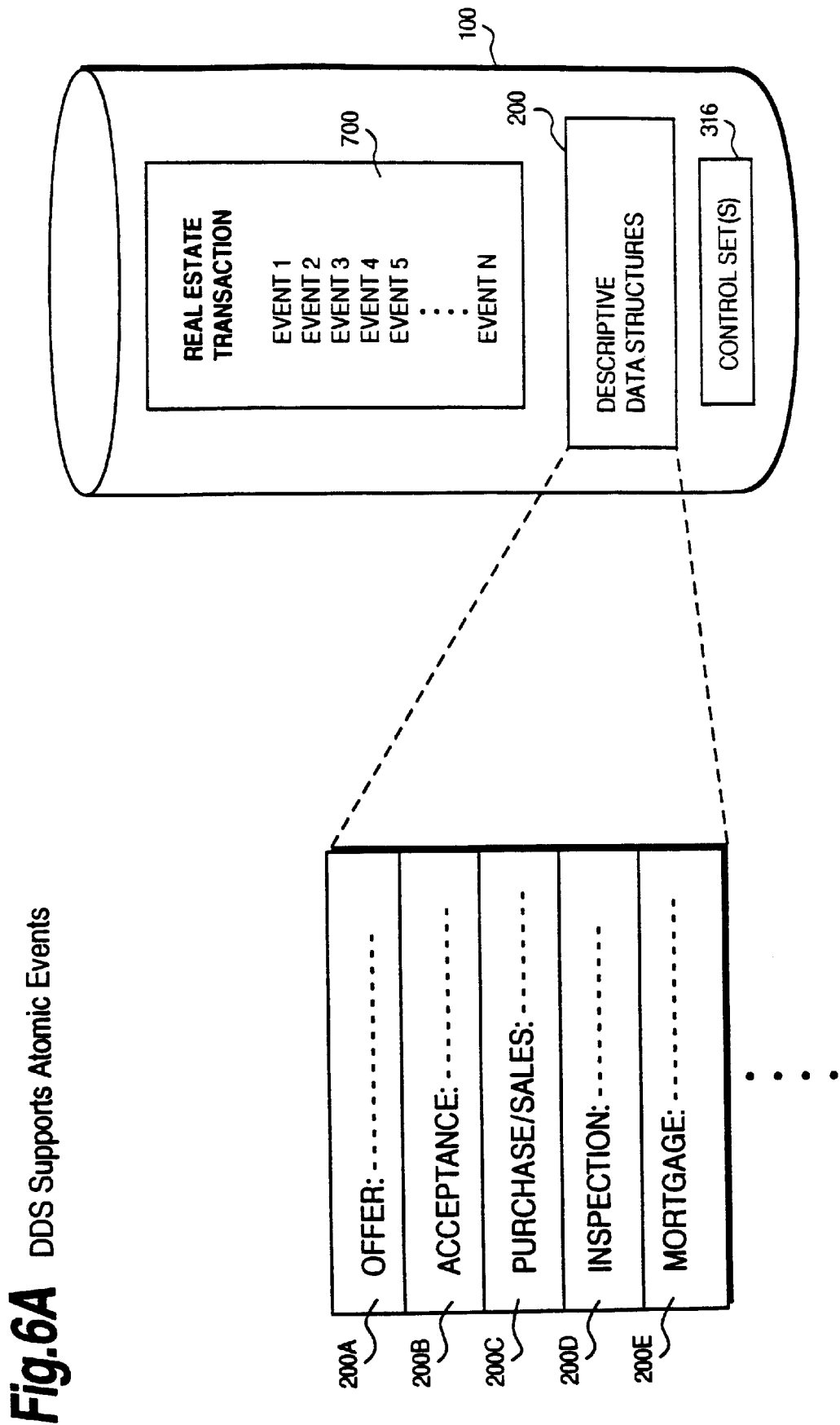
Fig.6A  DDS Supports Atomic Events

Fig. 7 Example Descriptive Data Structure Format
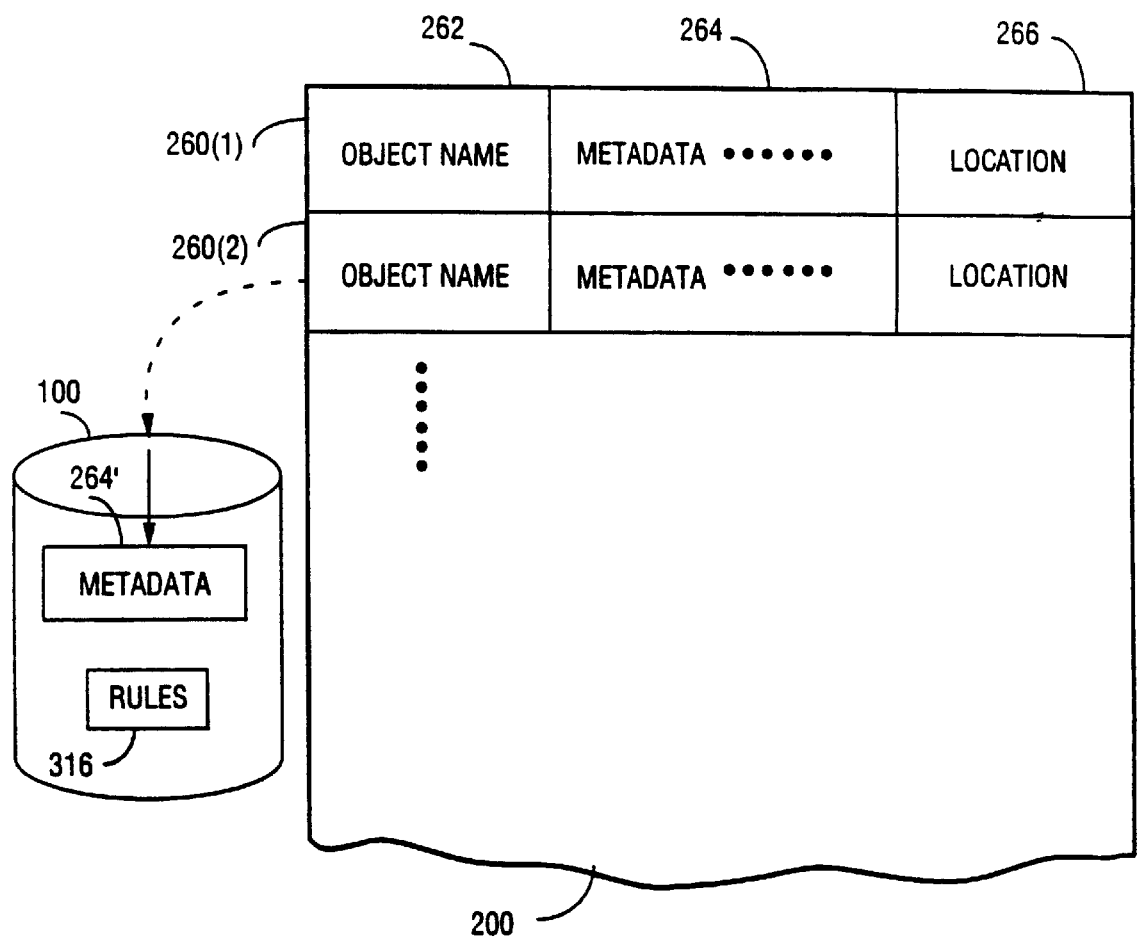

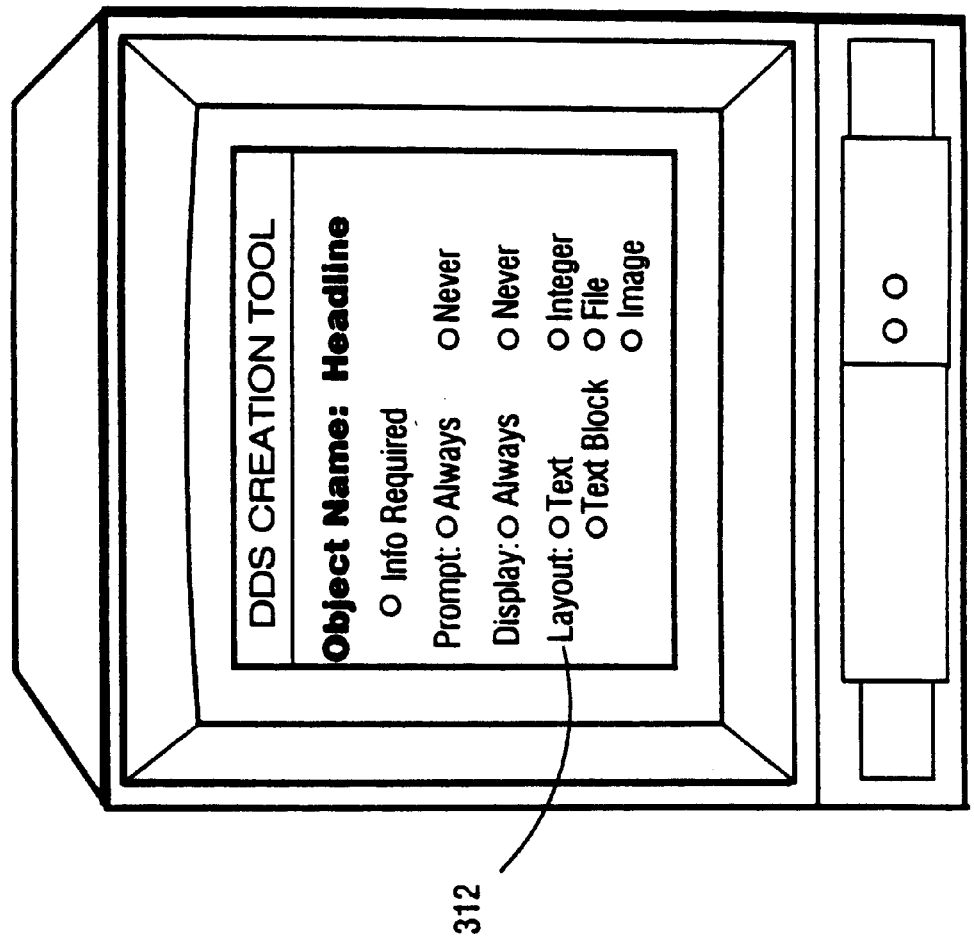
Fig. 8 Example DDS Creation Graphics Interface

TECHNIQUES FOR DEFINING USING AND MANIPULATING RIGHTS MANAGEMENT DATA STRUCTURES

CROSS-REFERENCE TO RELATED APPLICATIONS

This application is related to commonly assigned application Ser. No. 08/388,107 of Ginter et al. entitled "SYSTEMS AND METHODS FOR SECURE TRANSACTION MANAGEMENT AND ELECTRONIC RIGHTS PROTECTION," filed on Feb. 13, 1995, now abandoned; and pending application Ser. No. 08/699,712 of GINTER et al. entitled "TRUSTED INFRASTRUCTURE SUPPORT SYSTEMS, METHODS AND TECHNIQUES FOR SECURE ELECTRONIC COMMERCE ELECTRONIC TRANSACTIONS AND RIGHTS MANAGEMENT" filed on Aug. 12, 1996, now pending. The entire disclosures, including the drawings, of those prior filed specifications are incorporated by reference into this application.

FIELD OF THE INVENTION

This invention relates to techniques for defining, creating, and manipulating rights management data structures. More specifically, this invention provides systems and processes for defining and/or describing at least some data characteristics within a secure electronic rights management container. The present invention also provides techniques for providing rights management data structure integrity, flexibility, interoperability, user and system transparency, and compatibility.

BACKGROUND AND SUMMARY OF THE INVENTIONS(S)

People are increasingly using secure digital containers to safely and securely store and transport digital content. One secure digital container model is the "DigiBox™" container developed by InterTrust Technologies Corp. of Sunnyvale, Calif. The Ginter et al. patent specification referenced above describes many characteristics of this DigiBox™ container model—a powerful, flexible, general construct that enables protected, efficient and interoperable electronic description and regulation of electronic commerce relationships of all kinds, including the secure transport, storage and rights management interface with objects and digital information within such containers.

Briefly, DigiBox containers are tamper-resistant digital containers that can be used to package any kind of digital information such as, for example, text, graphics, executable software, audio and/or video. The rights management environment in which DigiBox™ containers are used allows commerce participants to associate rules with the digital information (content). The rights management environment also allows rules (herein including rules and parameter data controls) to be securely associated with other rights management information, such as for example, rules, audit records created during use of the digital information, and administrative information associated with keeping the environment working properly, including ensuring rights and any agreements among parties. The DigiBox™ electronic container can be used to store, transport and provide a rights management interface to digital information, related rules and other rights management information, as well as to other objects and/or data within a distributed, rights management environment. This arrangement can be used to provide an electronically enforced chain of handling and control wherein rights management persists as a container moves from one entity to another. This capability helps support a digital rights management architecture that allows content rightsholders (including any parties who have system authorized interests related to such content, such as content republishers or even governmental authorities) to securely control and manage content, events, transactions, rules and usage consequences, including any required payment and/or usage reporting. This secure control and management continues persistently, protecting rights as content is delivered to, used by, and passed among creators, distributors, repurposers, consumers, payment disaggregators, and other value chain participants.

For example, a creator of content can package one or more pieces of digital information with a set of rules in a DigiBox secure container—such rules may be variably located in one or more containers and/or client control nodes—and send the container to a distributor. The distributor can add to and/or modify the rules in the container within the parameters allowed by the creator. The distributor can then distribute the container by any rule allowed (or not prohibited) means—for example, by communicating it over an electronic network such as the Internet. A consumer can download the container, and use the content according to the rules within the container. The container is opened and the rules enforced on the local computer or other InterTrust-aware appliance by software InterTrust calls an InterTrust Commerce Node. The consumer can forward the container (or a copy of it) to other consumers, who can (if the rules allow) use the content according to the same, differing, or other included rules—which rules apply being determined by user available rights, such as the users specific identification, including any class membership(s) (e.g., an automobile club or employment by a certain university). In accordance with such rules, usage and/or payment information can be collected by the node and sent to one or more clearinghouses for payment settlement and to convey usage information to those with rights to receive it.

The node and container model described above and in the Ginter et al. patent specification (along with similar other DigiBox/VDE (Virtual Distribution Environment) models) has nearly limitless flexibility. It can be applied to many different contexts and specific implementations. For example, looking at FIGS. 1A and 1B, a newspaper publisher can distribute a newspaper 102 within a container 100A. A publisher of fashion magazines 106 can distribute the fashion magazines within another container 100C. Similarly, for example, a wholesale banking environment may use yet a further container, an electronic trading system may use a still further container, and so on.

The InterTrust DigiBox container model allows and facilitates these and other different container uses. It facilitates detailed container customization for different uses, classes of use and/or users in order to meet different needs and business models. This customization ability is very important, particularly when used in conjunction with a general purpose, distributed rights management environment such as described in Ginter, et al. Such an environment calls for a practical optimization of customizability, including customizability and transparency for container models. This customization flexibility has a number of advantages, such as allowing optimization (e.g., maximum efficiency, minimum overhead) of the detailed container design for each particular application or circumstance so as to allow many different container designs for many different purposes (e.g., business models) to exist at the same time and be used by the rights control client (node) on a user electronic appliance such as a computer or entertainment device.

While supporting a high degree of flexibility has great advantages, it can produce difficulties for the average user. For example, think of the process of creating a painting. A master painter creates a painting from a blank canvas. Because the canvas was blank at the beginning, the painter was completely unconstrained. The painting could have been a landscape, a portrait, a seascape, or any other image—limited only by the painter's imagination. This flexibility allows a master painter to create a masterpiece such as the "Mona Lisa." However, great skill is required to create a pleasing image starting from a blank canvas. As a result, an inexperienced painter cannot be expected to create a good painting if he or she begins with a blank canvas.

Consider now an amateur painter just starting out. That person does not have the skill to transform a blank canvas to a pleasing image. Instead of spending years trying to acquire that skill, the amateur can go out and buy a "paint by numbers" painting kit. Instead of using a blank canvas, the amateur painter begins with a preprinted canvas that defines the image to be painted. By following instructions ("all areas labeled "12" should be painted with dark red," "all areas labeled with "26" should be painted with light blue"), the amateur can—with relatively little skill—paint a picture that is relatively pleasing to the eye. To do this, the amateur must rigidly adhere to the preprinted instructions on the canvas. Any deviations could cause the final image to come out badly.

Ease of use problems in the computer field can be analogized to the "paint by numbers" situation. If it is important for untrained and/or inexperienced users to use particular software, the system designers can predefine certain constructs and design them into the system. This technique allows inexperienced users to make use of potentially very complicated designs without having to fully understand them—but this normally strictly defines, that is severely limits, the functionality and flexibility available by use of the program. As a result, creative solutions to problems are constrained in order to provide practical value. In addition, even the experienced user can find great advantage in using previously implemented designs. Because a user can program a complex program, for example, does not mean it is appropriate or efficient to create a program for a specific purpose, even if the previously implemented program is not ideal. If the creation of a new program "costs" more to create, that is takes too much time or financial resources, the experienced user will normally use a previously implemented program, if available. Therefore, the greatest total amount of value to be realized, related to customization, is to be able to customize with great ease and efficiency so that the cost of customization will not exceed the benefits.

Uniformity, flexibility, compatibility and interoperability are other considerations that come into play in the computer field, particularly in regards to systems supporting customization. In the painting situation, the human eye can appreciate uniqueness—and the "one of a kind" nature of a masterpiece such as the Mona Lisa is a big part of what makes a painting so valuable. In contrast, it is often desirable to make uniform at least the overall layout and format of things in the computer field. It is much more efficient for a computer to know beforehand how to treat and use objects. If the computer doesn't know beforehand how to read or handle an input object, for example, then the computer and the object are said to be "incompatible", i.e., they cannot work together. Computers are said to be "interoperable" if they can work together. Incompatibility and interoperability problems can prevent one computer from talking to another computer, and can prevent you from using computer data created by someone else.

For example, in the non-computer world, a Frenchman who knows only a little English as a second language, might find it far more meaningful and efficient to describe a complex problem in his native tongue, French. But if he is speaking to a second person, an Englishman, and the Englishman does not understand French, the two are not interoperable in French, and the Frenchman must resort to the far less efficient option of speaking in English to the Englishman. Of course, this is far better than if he was trying to speak to a German who understood neither English nor French. Then the two would be not be "interoperable" in regards to discussing the problem. Similarly, because rights management containers may potentially be exchanged and used for a large number of different purposes by a large number of different users, groups, and organizations, it is very important to provide compatibility and interoperability if these different parties, each participating in one or more different rights management models, are to interoperate efficiently. For example, if a rights management container is used to distribute a newsletter and is optimized for this purpose, each reader of the newsletter must have a computer system or software that "knows" how to read the container and the newsletter it contains. Since commerce, such as distributing newsletters, needs to be as efficient and cost-effective as is feasible, it is important to optimize, that is customize, rights management containers to optimally reflect the requirements of their models and not to have unnecessary features for each respective application or class of application, since unnecessary features will require unnecessary computing overhead and/or storage space.

Different newsletter publishers may use different container formats customized to their own particular newsletters and/or content types and/or formats. A newsletter reader interested in many different newsletters may need to be able to read a large number of different formats. It normally will not efficient (or, due to security issues, may not be appropriate) simply to analyze the different containers upon delivery and "try to figure out" or otherwise discern the particular format in use.

Published standards may help achieve a level of interoperability and standards for given types of applications, but it generally takes a long time for any particular standard to achieve industry-wide acceptance and standards will need to vary widely between categories of applications. Moreover, data structure and other standards are often designed to the lowest common denominator—that is, they will carry fields and requirements not needed by some, and miss others features optimal in certain cases. There will always be applications that cannot be optimized for efficiency and/or operation if forced to use a specific standard.

Trade-offs between flexibility, ease of use and incompatibility and interoperability can be further complicated when security considerations come into play. To be effective in many electronic commerce applications, electronic container designs should be tamper-resistant and secure. One must assume that any tools widely used to create and/or use containers will fall into the hands of those trying to break or crack open the containers or otherwise use digital information without authorization. Therefore, the container creation and usage tools must themselves be secure in the sense that they must protect certain details about the container design. This additional security requirement can make it even more difficult to make containers easy to use and to provide interoperability.

The above-referenced Ginter et al. patent specification describes, by way of non-exhaustive example, "templates" that can act as a set (or collection of sets) of control instructions and/or data for object control software. See, for example, the "Object Creation and Initial Control Structures," "Templates and Classes," and "object definition file," "information" method and "content" methods discussions in the Ginter et al. specification. The described templates are, in at least some examples, capable of creating (and/or modifying) objects in a process that interacts with user instructions and provided content to create an object. Ginter et al. discloses that templates may be represented, for example, as text files defining specific structures and/or component assemblies, and that such templates—with their structures and/or component assemblies—may serve as object authoring and/or object control applications. Ginter et al. says that templates can help to focus the flexible and configurable capabilities inherent within the context of specific industries and/or businesses and/or applications by providing a framework of operation and/or structure to allow existing industries and/or applications and/or businesses to manipulate familiar concepts related to content types, distribution approaches, pricing mechanisms, user interactions with content and/or related administrative activities, budgets, and the like. This is useful in the pursuit of optimized business models and value chains providing the right balance between efficiency, transparency, productivity, etc.

The present invention extends this technology by providing, among other features, a machine readable descriptive data structure for use in association with a rights management related (or other) data structure such as a secure container. In one example, the machine readable descriptive data structure may comprise a shorthand abstract representation of the format of the data within a rights management related data structure. This abstract data representation can be used to describe a single rights management data structure, or it may be generic to a family of data structures all following the format and/or other characteristics the abstract representation defines. The abstract representation may be used to create rights management data structures, allow others (including "other" rights management nodes automatically) to read and understand such data structures, and to manipulate some or all of the data structures.

The descriptive data structure can be used as a "template" to help create, and describe to other nodes, rights management data structures including being used to help understand and manipulate such rights management data structures.

In one particularly advantageous arrangement, the machine readable descriptive data structure may be associated with one or a family of corresponding rights management data structures—and may thus be independent of any specific particular rights management data structure usage. For example, a copy of the descriptive data structure may be kept with such data structures. Alternatively, some or all of the descriptive data structure may be obtained from somewhere else (e.g., a clearinghouse or repository) and independently delivered on as-needed basis.

In accordance with one example, the machine readable descriptive data structure provides a description that reflects and/or defines corresponding structure(s) within the rights management data structure. For example, the descriptive data structure may provide a recursive, hierarchical list that reflects and/or defines a corresponding recursive, hierarchical structure within the rights management data structure. In other examples, the description(s) provided by the descriptive data structure may correspond to complex, multidimensional data structures having 2, 3 or n dimensions. The descriptive data structure may directly and/or indirectly specify where, in an associated rights management data structure, corresponding defined data types may be found. The descriptive data structure may further provide metadata that describes one or more attributes of the corresponding rights management data and/or the processes used to create and/or use it. In one example, the entire descriptive data structure might be viewed as comprising such metadata.

The machine readable descriptive data structure may or may not be, in part or in whole, protected, depending on the particular application. Some machine readable descriptive data structures may be encrypted in whole or in part, while others might be maintained in "clear" form so that they are easily accessible. Some machine readable description data structures, whether encrypted or not, may be in part or wholly protected for integrity using a cryptographic hash algorithm in combination with a secrecy algorithm to form a cryptographic seal, and/or through use of other protection techniques (including hardware, e.g., secure semiconductor and/or hardware packaging protection means). The machine readable descriptive data structures may themselves be packaged within rights management data structures, and rules (e.g., permissions records) controlling their access and use may be associated with them.

In accordance with one aspect of how to advantageously use descriptive data structures in accordance with a preferred embodiment of this invention, a machine readable descriptive data structure may be created by a provider to describe the layout of the provider's particular rights management data structure(s) such as secure containers. These descriptive data structure ("DDS") templates may be used to create containers. A choice among two or more possible DDSs may be based upon one or more classes and/or one or more classes may be based on parameter data. The DDS may be loaded and used as the layout rules for secure containers being created. The provider can keep the DDS private, or publish it so that other providers may create compatible, interoperable containers based on the same DDS.

Descriptive data structures can also be used by a container viewer, browser, reader, or any other end user application designed to work with containers. Truly generic viewers or other applications can be written that can process a container in any format at least in part by making use of descriptive data structures. Thus, a descriptive data structure can be used to at least temporarily convert and/or customize a generic viewer (or other application) into a specialized viewer (or other application) optimized around one or more classes of containers. Additionally, specialized readers may be provided to efficiently process descriptive data structures to locate key media elements (e.g., cover page, table of contents, advertiser's index, glossary, articles, unprotected preview, price, and/or rights information regarding viewing, printing, saving electronically, redistributing, related budgets and/or other parameter information, etc.).

Such specialized readers can then seamlessly, transparently, and automatically process to present the user with an easy-to-use interface (for example, an icon display for each of the key media elements) optimized for the specific application, container, and/or user. Different and/or differently presented, such elements may be displayed or otherwise employed based, for example, on the identity of the user and/or user node, including, for example, taking into account one or more class attributes which can influence such automated processing.

Two or more DDSs may be associated with a container and/or container contents, as well as, for example, one or more user and/or node classes. A choice among two or more possible DDSs for a given container and/or class of containers and/or container contents may therefore be based upon one or more classes and/or one or more classes based on parameter data. Overall, this ability to easily characterize, and/or reuse stored, optimized, custom container models and subsequent transparency of translation from such customized containers (e.g., specific DDSs) to general purpose rights management use is particularly useful. For example, where such customized DDSs can be used as a basis for the creation of customized, optimized display of container content and/or control information to substantially improve the ease of use, efficiency, transparency, and optimization of a distributed, generalized rights management environment. In such an environment, for example, user nodes can interact with different DDSs to automatically adjust to the requirements of the commercial or other rights models associated with such DDSs.

Some providers may spend considerable time designing sophisticated container descriptive data structures that describe the layout of their associated containers. With this type of investment in structure and format, the descriptive data structure will often have significant value in their reuse for the same or similar applications. Entities can use descriptive data structures in-house to ensure consistent and highly efficient creation of containers. Third party providers (i.e., a provider other than the one responsible for descriptive data structure creation) can use these descriptive data structures when they wish to create containers compatible with other entities. One example is where the publisher of a widely circulated newspaper develops a descriptive data structure for reading its newspaper. Other, smaller newspapers may want to leverage any viewers or other tools put in place for use with the widely circulated newspaper by adopting the same container format. Descriptive data structures can be copyrighted and/or otherwise protectable by both law and by the rights management system itself. For example, they may also be protected by their own containers and associated controls to ensure that descriptive data structure creators, and/or distributors and/or other users of such DDSs, receive their fair, rights system managed, return on their descriptive data structure creation and/or use related efforts.

In addition to the foregoing, the following is a list of features and advantages provided in accordance with aspects of this invention:

Integrity Constraints: The descriptive data structure allows the provider to protect the integrity of his or her content, by enabling the specification of integrity constraints. Integrity constraints provide a way to state integrity related rules about the content.

Application Generation: The descriptive data structure can be used to generate one or more portions of software programs that manipulate rights management structures. For example, a descriptive data structure could serve as 'instructions' that drive an automated packaging application for digital content and/or an automated reader of digital content such as display priorities and organization (e.g., order and/or layout).

Dynamic user interfaces for creation applications: Applications can read a descriptive data structure to generate an interface optimized for data creation, editing, and/or composition for a specific model, including models involving, for example, composing complex content from textual, audio, video, and interactive (e.g., querying) elements. The data may take the form of a container, database and/or any other digital information organization as any simple or compound and complex file format. Applications can also read a descriptive data structure to learn how to best display an interface for collection and/or creation of content.

Dynamic user interfaces for display applications: Applications can read a descriptive data structure to and generate an interface appropriate for data display. This data may be a container, database or any other compound complex file format. Applications can also read a descriptive data structure to learn how to best display an interface for the presentation of content. Applications can further read a descriptive data structure to learn how to manage display functions related to interacting—for content creation and/or packaging and/or user display purposes including optimizing any of such interactions—with other one or more other applications, smart agents, computing environments, identity (including any class identities) of user and/or user nodes, etc. For example, a user interface might be differently optimized for interacting with: a member of the U.S. Air Force versus a faculty member in social sciences at a university; or a member of a Kiwanis Club versus a member of a Protestant church club, a citizen of the United States versus a citizen of Saudia Arabia, including an appropriate display of expected class membership symbols and related, appropriate organization or suppression of displayed information.

Ability to automatically identify and locate data fields: Full text search, agents, web spiders, and the like, benefit and are able to interact with information contained within one or more areas of a DDS when areas within a data file are known to contain potentially interesting information and such information is presented in a predefined format.

Ability to extract needed or desired data without firsthand knowledge of data format: Full text search, agents, web spiders, and the like, benefit and are able to interact with information contained within one or more areas of a DDS when large data files of arbitrary complexity and of unknown origin can be processed without special knowledge.

Efficient, machine/human readable data abstract: The descriptive data structures can be optimally small, convenient, and cost-effective to process, transmit, and/or store.

Reusable, salable—independent of actual data: Descriptive data structures may be arbitrarily complex and therefore potentially time consuming to construct and requiring certain expertise. This gives the descriptive data structure resale value.

On-the-fly definition and redefinition of content layout: Working with a layout tool allows quick iterations (including editing and modifications) of a design (layout) which can be more convenient and cost-effective than creating such a layout, which also may be quite difficult or beyond the expertise of many users.

Descriptive data structure attributes allow for meta-characteristics not found in actual data: Because the same descriptive data structure is processed by both the creation and post-creation processes, meta-information can be placed into the descriptive data structure that would otherwise be unavailable in the packaged content. One example of this whether display of certain fields is "Required" or "Hidden".

Enables design automation via descriptive data structure "wizards": Descriptive data structures themselves enable further automation in the way of "wizards".

There can, for example, be descriptive data structures that help to define other descriptive data structures. Descriptive data structures defining other descriptive data structures might represent the incomplete descriptive data structure for a book or magazine, for example. The "wizard" can comprise a series of dialog boxes displayed to the user to fill in the missing information to make it a completed descriptive data structure.

Applications outside of a particular rights management architecture: For example, polymorphous applications may use descriptive data structures to determine certain data visualizations attributes and/or requirements, such as what look and feel should be displayed to the user. For example, if a descriptive data structure contains a word processing document reference, the polymorphous application might create an interface appropriate for display and editing of a document. If the descriptive data structure contains references to many executable programs, the polymorphous application might ask the user where the files should be saved.

Enables umbrella applications to process descriptive data structures and delegate unknown file types and processes: Umbrella (or polymorphous) applications can, for example, act substantially as an operation for a particular data file. This umbrella application may extract and process those things in the data file that it cares about, while ignoring or delegating (to, for example, user and/or value chain partner (e.g., distributor) to control display of such items) those things it does not understand.

Runtime interpretation: It is possible to interpret a descriptive data structure at run time, providing materially increased efficiencies and timeliness.

Runtime adaptability: Systems can adapt to dynamic data arriving in real time through use of descriptive data structures.

Automatic conversion capability: Descriptive data structures be used for converting automatically from one format to another.

Simplified system design: The use of descriptive data structures may greatly reduce the need for a secondary "wrapper" application programming interface (API) or other arrangement to securely "contain" the container creation process. Such a "wrapper" API to control and otherwise restrict the container creation process might otherwise be needed to ensure that all created containers are compatible—thereby limiting flexibility and the ability to customize.

Object oriented template programming environment: The use of display related, interaction related, and rights related concept objects which may be selected through high-level user interface choices and prioritizations and specification of related parameter data, this enabling very easy creation of certain categories of templates— such as construction and display hint information.

The use of a template language and interpreter involving supporting programming through use of language elements and interpretation of such language by nodes described in Ginter, et al., where such language includes elements descriptive of display, rights, and program interaction elements, priorities and parameter data.

BRIEF DESCRIPTION OF THE DRAWINGS

These and other features and advantages of presently preferred example embodiments in accordance with the invention may be better and more completely understood by referring to the following detailed description along with the drawings, of which:

FIGS. 2A and 2B show example content containers associated with example descriptive data structures;

FIG. 4 shows another example creation and usage process;

FIG. 5 shows an example system architecture using descriptive data structures;

FIG. 6 shows an hierarchical descriptive data structure organization;

FIG. 6A shows an example of how descriptive data structures can be used with atomic transaction data;

FIG. 7 shows an example descriptive data structure format;

FIG. 8 shows an example descriptive data structure creation graphical interface;

DETAILED DESCRIPTION OF PRESENTLY PREFERRED EXAMPLE EMBODIMENTS

Figure 1A:
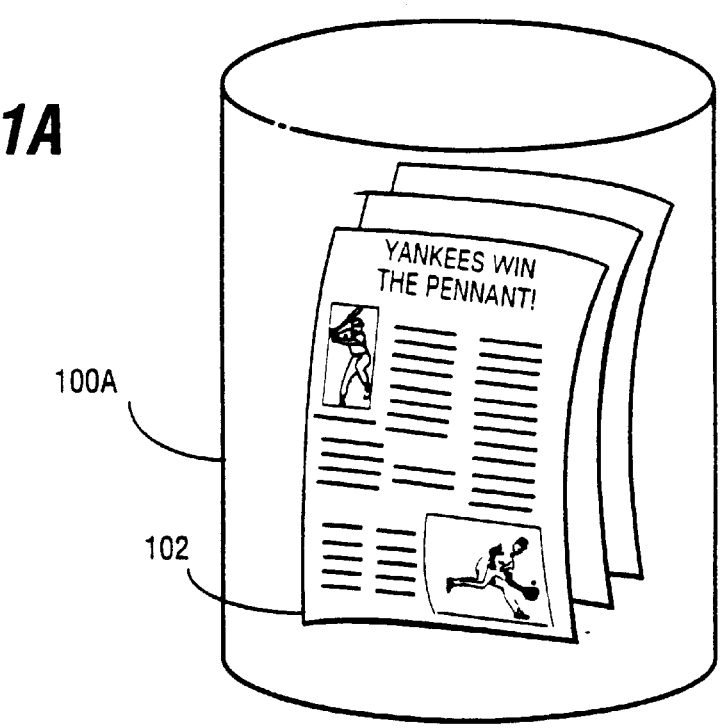
FIGS. 1A and 1B show example content containers.
Figure 1B:
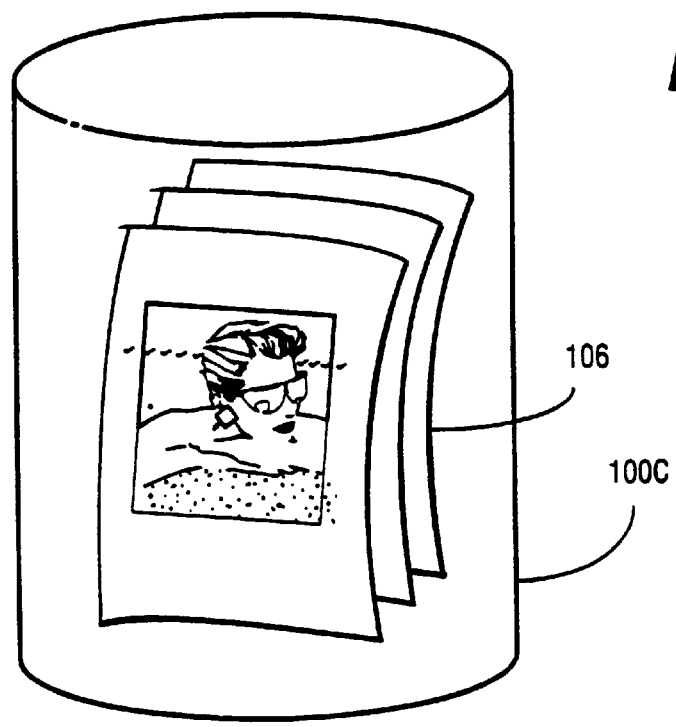
Figure 2A:
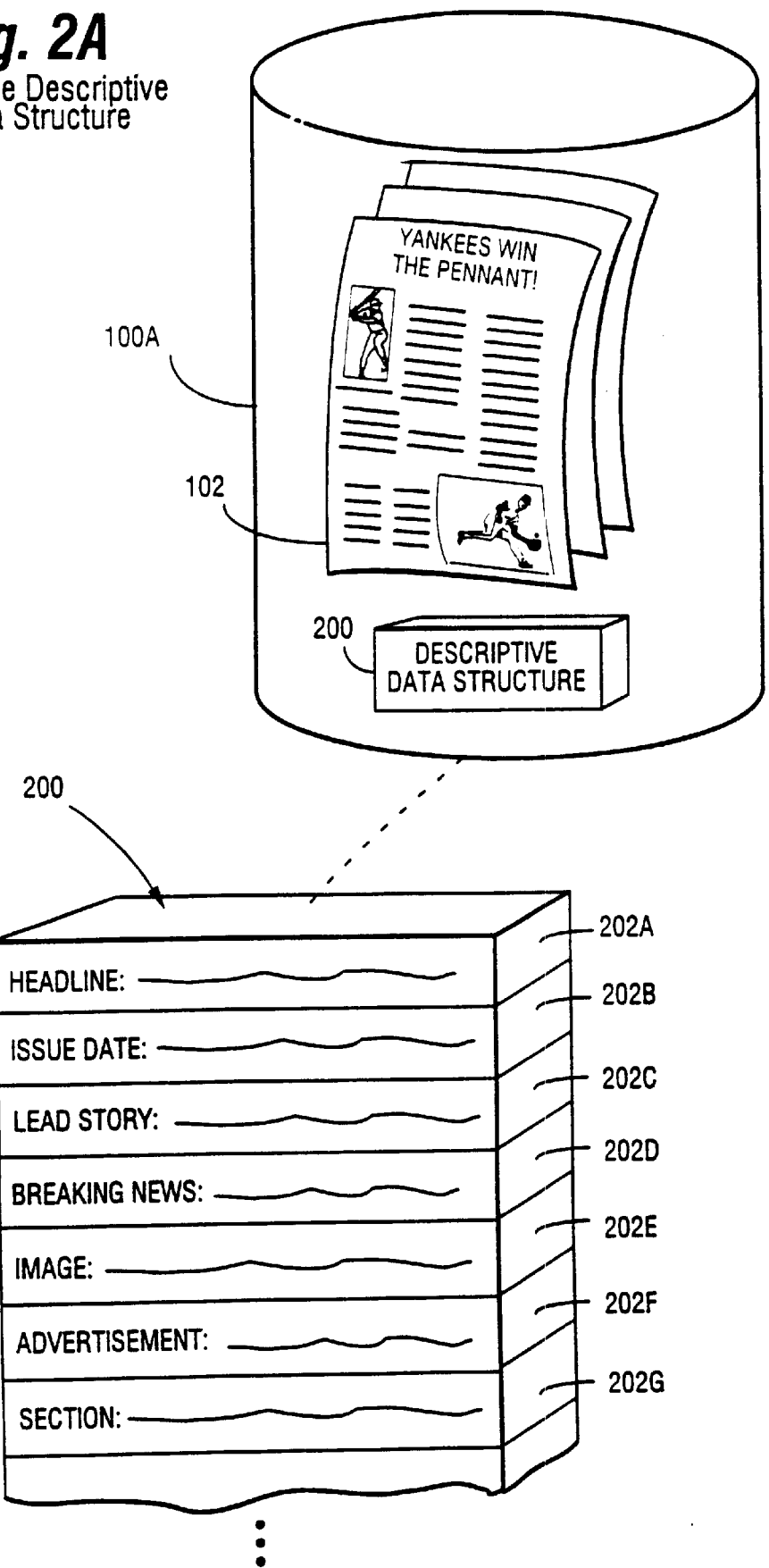

FIGS. 2A and 2B show the example containers 100a, 100c of FIGS. 1A, 1B associated with machine readable descriptive data structures 200 and 200'. Referring to FIG. 2A, a descriptive data structure 200 is associated with content container 100a. This descriptive data structure 200 may be used to define the content (and certain other characteristics) of container 100a. In the example shown, descriptive data structure 200 defines a number of sections of newspaper style content 102 such as, for example, the headline (descriptor 202a), the issue date (descriptor 202b), the lead story (descriptor 202c), breaking news (descriptor 202d), image(s) (descriptor 202e), advertisement (descriptor 202f), and section (descriptor 202g).

The descriptive data structure definitions 202 in this example do not contain or specify the particular contents of corresponding portions of the newspaper 102, but instead define more abstractly, a generic format that a newspaper style publication could use. For example, the FIG. 2A example descriptive data structure headline definition 202a does not specify a particular headline (e.g., "Yankees Win the Pennant!"), but instead defines the location (for example, the logical or other offset address) within the container data structure 100a (as well as certain other characteristics) in which such headline information may reside. Because descriptive data structure 200 is generic to a class or family of newspaper style content publications, it can be reused. For example, each daily issue of a newspaper might be created using and/or associated with the same descriptive data structure 200. By abstractly defining the data format and other characteristics of newspaper style content 102, the descriptive data structure 200 allows easy creation, usage and manipulation of newspaper style content 102.

Referring to FIG. 2B, a different descriptive data structure 200' may be used to define another class of content publications 106 such as fashion magazines. The descriptive data structure 200' for this content class reflects a different format (and possibly other characteristics) as compared to the descriptive data structure 200 shown in FIG. 2A. For example, since fashion magazines typically do not include headlines or breaking news, the example descriptive data structure 200' may not define such formatting. Instead, descriptive data structure 200' for defining a class of fashion magazine content may define issue date (descriptor 204a), a magazine title (descriptor 204b), the name of a photographer (descriptor 204c) and associated artwork designation (descriptor 204d).

The FIGS. 2A and 2B examples show descriptive data structures 200, 200' being delivered within content object containers 100a, 100c along with associated content 102, 106. However, other forms of association may be used. For example, descriptive data structure 200 can be independently delivered in its own separate container along with associated rules controlling its access and/or use. Alternatively, descriptive data structures 200 could be stored in a library and delivered on an as needed basis in secure or insecure form depending on particular requirements.

In addition, although FIGS. 2A and 2B are printed publication content examples, the use of descriptive data structures 200 is not so limited. To the contrary, descriptive data structures 200 can be used to define the format and/or other characteristics associated with a wide variety of different types of digital information including for example:

- images
- sound
- video
- computer programs
- methods
- executables
- interpretables
- currency objects
- currency containers for currency objects
- rules
- any computer input
- any computer output
- other descriptive data structures
- any other information.

Example Process For Creating and Using Descriptive Data Structures

Figure 3:
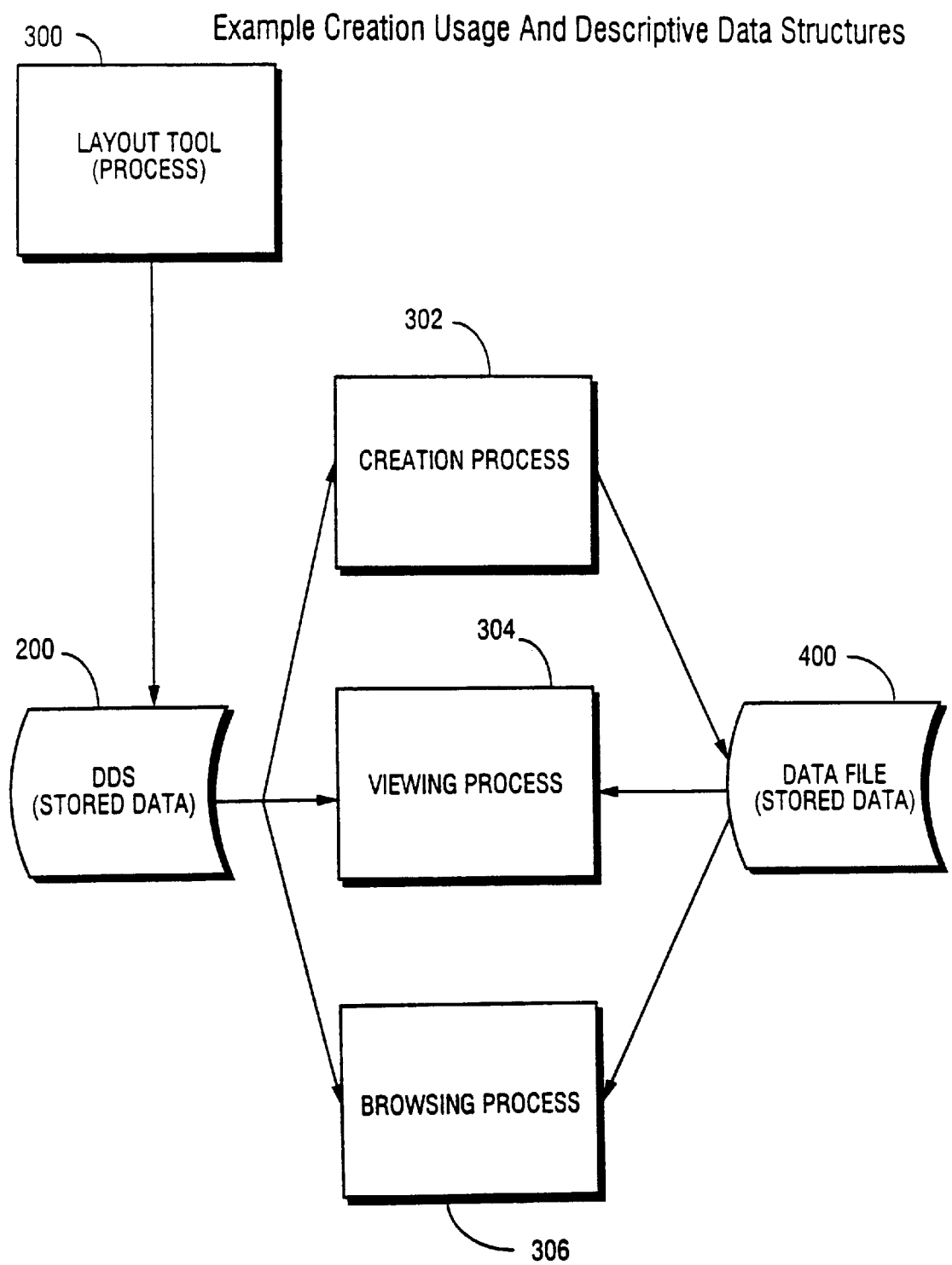
FIG. 3 shows an example descriptive data structures creation and usage process.

FIG. 3 shows an example process for creating and using descriptive data structures 200. In this example, a layout tool 300 is used to create descriptive data structure 200. This layout tool 300 may be, for example, a software-controlled process interacting with a human being via a graphical user interface. The resulting descriptive data structure 200 (which may be stored on a mass storage device or other memory) can then be used to facilitate any number of other processes to create or interpret stored data. For example, the descriptive data structure may be used in a creation process 302. The creation process 302 may read the descriptive data structure and, in response, create an output file 400 with a predefined format such as, for example, a container 100 corresponding to a format described by the descriptive data structure 200. A viewing process 304 may use the descriptive data structure 200 to locate important items in the output file 400 for display. A browsing process 306 may use the descriptive data structure 200 to locate items within the stored output file 400 such as, for example, key words or other searchable text. Descriptive data structure 200 may supply integrity constraints or rules that protect the integrity of corresponding content during use of and/or access to the content.

FIG. 4 shows a more detailed example descriptive data structure creation and usage process. In this example, the layout tool 300 may accept user input 310 provided via a graphical user interface 312. The output of the layout tool 300 may be a descriptive data structure 200 in the form of, for example, a text file. A secure packaging process 302a may accept container specific data as an input, and it may also accept the descriptive data structure 200 as a read only input. The packager 302a could be based on a graphical user interface and/or it could be automated. The packager 302a packages the container specific data 314 into a secure container 100. It may also package descriptive data structure 200 into the same container 100 if desired. A viewer 304 may view data 314 with the assistance of the descriptive data structure 200 and in accordance with rules 316 packaged within the container applying to the data 314 and/or the descriptive data structure 200.

Example Architecture For Using Descriptive Data Structures

FIG. 5 shows an example secure system architecture suitable for use with descriptive data structure 200. In this example, an electronic appliance 500 of the type described in the above-referenced Ginter et al. patent specification may be provided within a tamper resistant barrier 502. Electronic appliance 500 may include an application program interface (API) 504. One or more applications 506 may communicate with electronic appliance 500 via API 504. In some examples, the application 506 may execute on the secure electronic appliance 500. Each application 506 may include a descriptive data structure interpreter 508. In use, electronic appliance 500 may access secure container 100 and—in accordance with rules 316—access the descriptive data structure 200 and content 102 it contains and provide it to application 506. The interpreter 508 within application 506 may, in turn, read and use the descriptive data structure 200. In addition, application 506 may be polymorphic in the sense that it can take on personality or behavior as defined at least in part by descriptive data structure 200.

Figure 5A:
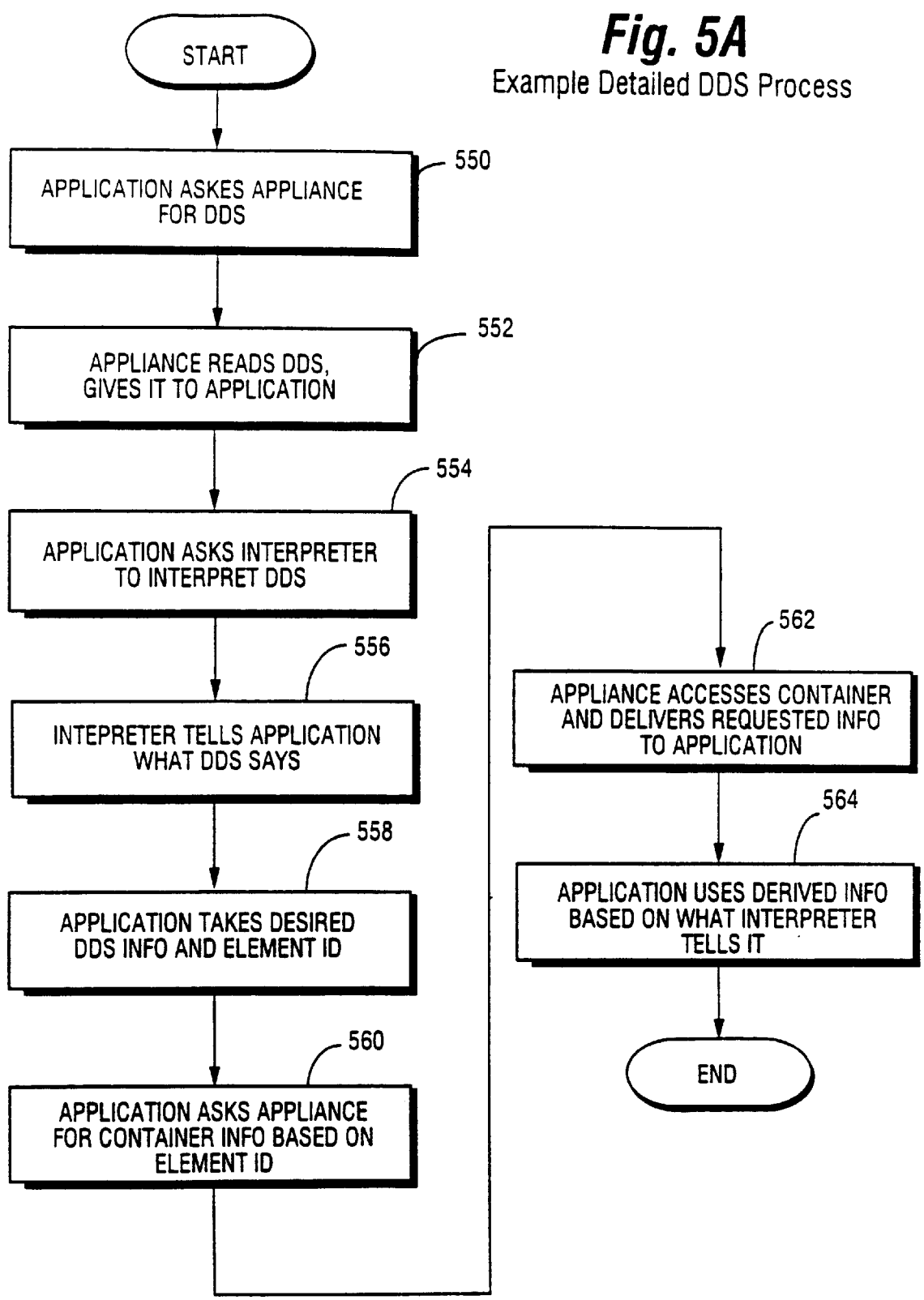
FIG. 5A shows an example process performed by the FIG. 5 system.

FIG. 5A shows an example detailed process performed by the FIG. 5 example secure system architecture. In this example, application 506 asks appliance 500 to retrieve the descriptive data structure 200 from container 100 (block 550). Electronic appliance 500 reads the descriptive data structure 200 and, subject to the conditions specified by associated rules 316, provides the descriptive data structure 200 to the application 506 (block 552). Application 506 then asks its interpreter 508 to interpret the descriptive data structure 200 (block 554). The interpreter 508 tells the application 506 what the descriptive data structure 200 says (block 556). The application 506 extracts or obtains the descriptive data structure information it needs or wants from interpreter 508 (block 558). For example, suppose the application 506 wants to display the "headline" information within newspaper style content shown in FIG. 2A. Application 506 may ask interpreter 508 to provide it with information that will help it to locate, read, format and/or display this "headline" information.

As another example, interpreter 508 may provide application 506 with an element identification (e.g., a hexadecimal value or other identifier) that corresponds to the headline information within the newspaper style content (block 558). Application 506 may then ask electronic appliance 500 to provide it with the Headline (or other) content information 102 within container 100 by providing appropriate content information to electronic appliance 500 via API 504 (block 560). For example, application 506 may pass the electronic appliance 500 the element ID that interpreter 508 provided to the application. Even though application 506 may have no direct knowledge of what is inside container 100 (and may only be able to access the container 100 through a secure VDE node provided by appliance 500), interpreter 508 (by looking at descriptive data structure 200) can tell application 506 enough information so that the application knows how to request the information it wants from the electronic appliance 500.

The electronic appliance may then access information 102 within container 100, and deliver (in accordance with the rules 316 within the container) the requested information to the application 506 (block 562). The application 506 may then use the information electronic appliance 500 provides to it, based at least in part on what interpreter 508 has told it about the content information (block 564). For example, the descriptive data structure 200 may provide characteristics about the way application 506 should handle the information 102. Descriptive data structure 200 can, for example, tell application 506 to always display a certain field (e.g., the author or copyright field) and to never display other information (e.g., information that should be hidden from most users). DDS 200 can also provide complete presentation or "visualization" information so that an information provider can, for example, control the look and feel of the information when it is displayed or otherwise rendered. Descriptive data structure 200 may provide encodings of other characteristics in the form of metadata that can also be used by application 506 during a process of creating, using or manipulating container 100. The DDS 200 can be used to generate a software program to manipulate rights management structures. For example, a DDS 200 could serve as the 'instructions' that drive an automated packaging application for digital content or an automated reader of digital content.

Example Description(s) Provided by Descriptive Data Structure

FIG. 6 shows one example of how a descriptive data structure 200 may describe and define an arbitrarily complex, information structure such as, for example, an hierarchical container 100. In this particular example, container 100 includes properties 600(1), 600(2). Property 600 (1) may include n attributes 602(1), 602(2) . . . 602(n). Property 600(2) may include any number of attributes 604(1), 604(2), and it may also include an additional property 606. Property 606 may, in turn, include its own attributes 608(1), 608(2) . . . . Associated descriptive data structure 200 may be organized as a tree structure list 250 providing a recursive structure to reflect the recursive structure of the contents of container 100. For example, list 250 may include "branches" in the form of "property" descriptors 252(1), 252(2) corresponding to properties 600(1), 600(2). Each property descriptor 252 may, in turn, include a list 254 of attributes and may include additional property descriptors 256 in the same recursive, hierarchical arrangement as is reflective of the example content container structure. DDS 200 may be used to describe arbitrarily complex, hierarchical or non-hierarchical data structures of any dimension (1 to n).

FIG. 6A shows that descriptive data structure 200 can be used in conjunction with any kind of information such as, for example, events or methods defining an "atomic transaction" such as a real estate transaction. In this FIG. 6A example, a container 100 includes one or more descriptive data structures 200 and associated control set(s) 316 relating to a sequence of "events" 700 that define a real estate transaction. The DDS 200 may, for example, include a number of different entries 200A–200N pertaining to each different "event" within the transaction (e.g., "offer", "acceptance", "purchase/sales", "inspection", "mortgage", etc.). These entries 200A–N may, for example, define where in container 100 the event can be found. The entries 200A–200N may also include metadata that provides additional characteristics corresponding to the event (for example, how certain information related to the event should be displayed).

Example Descriptive Data Structure Formatting

FIG. 7 shows an example of how descriptive data structure 200 may be formatted. As mentioned above, descriptive data structure 200 may comprise a list such as a linked list. Each list entry 260(1), 260(2), . . . may include a number of data fields including, for example:

an object name field 262,
one or more metadata fields 264 (which may be part of and/or referenced by the descriptive data structure); and
location information 266 (which may be used to help identify the corresponding information within the container data structure 100).

The object name field 262 may include a constant that may corresponds to or describes a type of information. For example, object name field 262 may act as a "handle" to the content or data; it may be an indirect reference to the content or data; and/or it may be used to look up the content or data. The following are examples of object names:

General Purpose Object Names
NUMBER
STRING
DATE
TITLE
DESCRIPTION
AUTHOR
PROVIDER
MIME_TYPE
VERSION
URL
EMAIL
NEWGROUP
FILE_NAME
KEYWORDS
CREATION_DATE
MODIFICATION_DATE
LAST_ACCESS_DATE
NATIVE_PLATFORM
SIZE
CONTENT
PREVIEW
THUMBNAIL
TEXT
ARTWORK
ILLUSTRATION
UNKNOWN
TEMPLATE
BILLING_NAME
CONTAINER
Book-style Object Names
DEADLINE_DATE
TITLE_PAGE
PROLOGUE
INTRODUCTION
ABSTRACT
TABLE_OF_CONTENTS CHAPTER
CHAPTER_NUMBER
INDEX
Electronic Mail-style Object Names
FROM
TO
CC
SUBJECT
MESSAGE_BODY
ENCLOSURE
Newspaper-style Object Names
ISSUE_DATE
ARTICLE
COLUMN
COVER_STORY
LEAD_STORY
BREAKING_NEWS
ADVERTISEMENT
SECTION
EDITORIAL The DDS 200 may include or reference any type of data or metadata. In one example, the DDS 200 uses the object name field 262 to points or refers to metadata. This metadata can define certain characteristics associated with the object name. For example, such metadata may impose integrity or other constraints during the creation and/or usage process (e.g., "when you create an object, you must provide this information", or "when you display the object, you must display this information"). The metadata 264 may also further describe or otherwise qualify the associated object name.

In one preferred example, the DDS 200 uses object name 262 to refer to metadata stored elsewhere—such as in a container 100. This referencing technique provides several advantages. For example, one situation where it may be useful to store the metadata in a secure container 100 separately from DDS 200 is in situations where it is desirable to make the DDS readily accessible to an outside application but to protect the associated metadata. For example, consider the case of handling web spider queries. A web spider may query the DDS 200 for a particular object name 262. If the object name is found, then the web spider may request the corresponding metadata. The web spider may have ready access to the metadata, but may only be able to access the associated metadata from the container 100 under appropriate conditions as controlled by a corresponding secure electronic appliance 500 based on associated rules 316. As another example, storing metadata separately from the DDS 200 may allow the same DDS to be used with different metadata in different contexts. Suppose for example that a DDS 200 contains an Object Name, for example KEYWORDS. When DDS 200 is associated with container 100A, then the DDS Object Name KEYWORDS refers to container 100A's KEYWORDS metadata. Conversely, if later this same DDS 200 is associated (e.g., packaged with) a different container 100C, then the DDS Object Name KEYWORDS refers to container 100B's KEYWORDS data.

Although it is preferred to use object name 262 to refer to metadata stored elsewhere, there may be other instances where there is a need or desire to explicitly include metadata within the DDS 200. For purposes of illustration, FIG. 7 shows an example DDS 200 that includes metadata field 264 and also refers to metadata within a container 100 using the object name 262. Either or both techniques may be used.

The DDS 200 thus allows value chain participants to protect the integrity of content, by enabling the specification of integrity constraints. DDS 200 integrity constraints provide a way to state rules about the content. For example, DDS 200 can specify that an article of a newspaper cannot be viewed without its headline being viewed. The corresponding integrity constraint can indicate the rule 'if there is an article, there must also be a headline". Another example is a photograph that is part of a magazine and the credit that goes with it. The integrity constraint rule provided by DDS 200 might be 'do not present this photograph without its associated credit'.

DDS integrity constraints give value chain participants a tool for protecting the use of the DDS 200, ensuring that content represented by a particular DDS contains all the essential components—that it is representative of the DDS. This gives providers a way to set up conventions and enforce standards of use. There are many possible integrity constraints. The following are a few examples:

Required: a is required as part of the content
Optional: a is an optional component of the content
Required relationship: if a is present, then b must be present, or if a is present b, c and d must be present. Conversely, if b is not present, then a is not allowed to be present. Relationships in this category are 1:m where m>0.
Optional relationship: If a is present b may or may not be present. If b is present, then a is guaranteed to be present. Relationships in this category are 1:n, where n>=0.
Repetition: a must occur n times where n>1. This could be specified with ranges of values, etc.
Other rules and/or requirements.

Metadata 264
Example Graphical Interface For Creating Descriptive Data Structures FIG. 8 shows an example descriptive data structure creation graphical user interface 312. In this example, the graphical user interface 312 may prompt the user for the object name. In addition, the graphical user interface 312 may provide options for specifying the associated metadata 264. The options shown in FIG. 8 may, for example, include:)

"construction type" metadata (upon object construction, the information is required; upon object construction, the object creation tool is to always or never prompt for the information);

display metadata (e.g., always display the associated information (e.g., for copyright notices, author names and the like) or always or never make the information visible; and/or layout "hints" and field definitions (e.g., text, text block, integer, file, image or other data type).

The above metadata descriptions are non-limiting examples. Other metadata characteristics and attributes may be used.

Example Process Using Descriptive Data Structures

Figure 9:
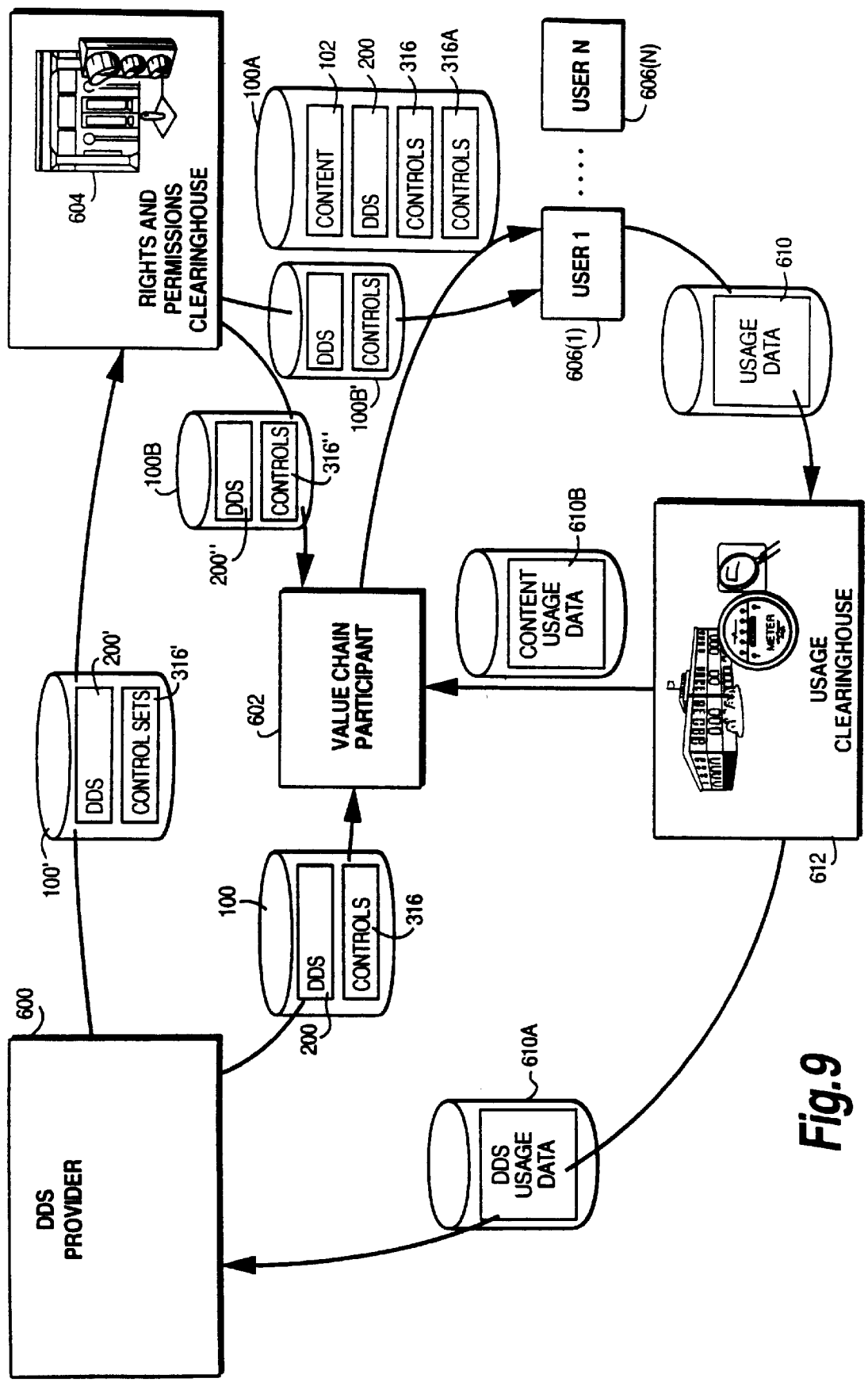
FIG. 9 shows an example process for tracking descriptive data structure rights management related data.

FIG. 9 shows one example arrangement for using the infrastructure described in co-pending related U.S. patent application Ser. No. 08/699,712 (referenced above) for descriptive data structures 200. The arrangement shown in FIG. 9 may be useful in a number of different contexts. For example, a provider 600 of descriptive data structures 200 may want to know which descriptive data structures 200 are the best liked by his customers so he or she can improve the quality of his products. Or, a provider 600 may charge customers for using descriptive data structures 200 on a per use or other basis. In still another example, some descriptive data structures 200 or classes of DDS 200 may be restricted to use only by authorized users or classes of authorized users.

FIG. 9 shows a DDS provider 600 who delivers a DDS 200 and an associated control set 316 to a value chain participant 602. Controls 316 may provide rules and associated consequences for controlling or otherwise affecting the use or other aspects of what value chain participant 602 can do with DDS 200. The controls 316 and DDS 200 may be packaged within a container 100. Value chain participant 602 may get the container 100 containing DDS 200 directly from DDS provider 600; alternatively, the provider can provide it a rights and permissions clearinghouse 604 and participant 602 and get it from the clearinghouse (or elsewhere) (see container 100B).

Value chain participant 602 can use DDS 200 to author content 102. Participant 602 can package content 102 with associated controls 316A in a container 100A. Participant 600 may, if he desires, include DDS 200 and associated controls 316a, 316b with content 102 in the same container—or depend on the provider 600 and/or rights and permissions clearinghouse 604 to independently deliver the DDS and its controls to end users 606 in another container 100c for example.

End users 606(1), . . . , 606(n) use DDS 200 (in accordance with controls 316) in conjunction with content 102 (for example, to read, browse or otherwise access the container content). Controls 316, 316A may require user appliances to provide usage data 610 to a usage clearinghouse 612. The usage clearinghouse 612 can provide usage data 610A related to access and/or usage of DDS 200 to DDS provider 600, and may independently provide usage data 610B related to access and/or usage of content 102 to value chain participant 602.

Descriptive Data Structures Can Be Used to Achieve A Degree of Interoperability Between Rights Management Environments Descriptive data structures 200 provided in accordance with the present invention can provide a degree of interoperability between source and target rights management environments, and/or to provide a bridge to achieve at least some degree of interoperatibility between a rights management environment and the outside world.

Different rights management environments may have substantially incompatible mechanisms for defining rights pertaining to an object. Descriptive data structures 200 can provide at least a partial bridge to achieve a degree of compatibility and interoperability. For example, a provider that defines an object within a source rights management environment may create a descriptive data structure for use by processes within one or more target rights management environments. For example, an object creator or other provider can specify, within a descriptive data structure 200, certain rules, integrity constraints and/or other characteristics that can or should be applied to the object after it has been imported into a target rights management environment. The target rights management environment can choose to selectively enforce such rules, constraints and/or other characteristics depending on the degree to which it can trust the source environment. For example, objects imported from an EDI system employing X.12 security may be more trustworthy than objects presented from environments with lesser (or no) security.

In another example, a provider that creates an object outside of any rights management environment can create a descriptive data structure 200 for use if and when the object is imported into one or more rights management environments. The target rights management environment(s) can use such descriptive data structure(s) to help efficiently understand and handle the object. Further, a descriptive data structure created within a rights management environment can be exported to one or more applications outside of the rights management environment and used to assist the application(s) in interpreting exported content or other information.

Figure 10A:
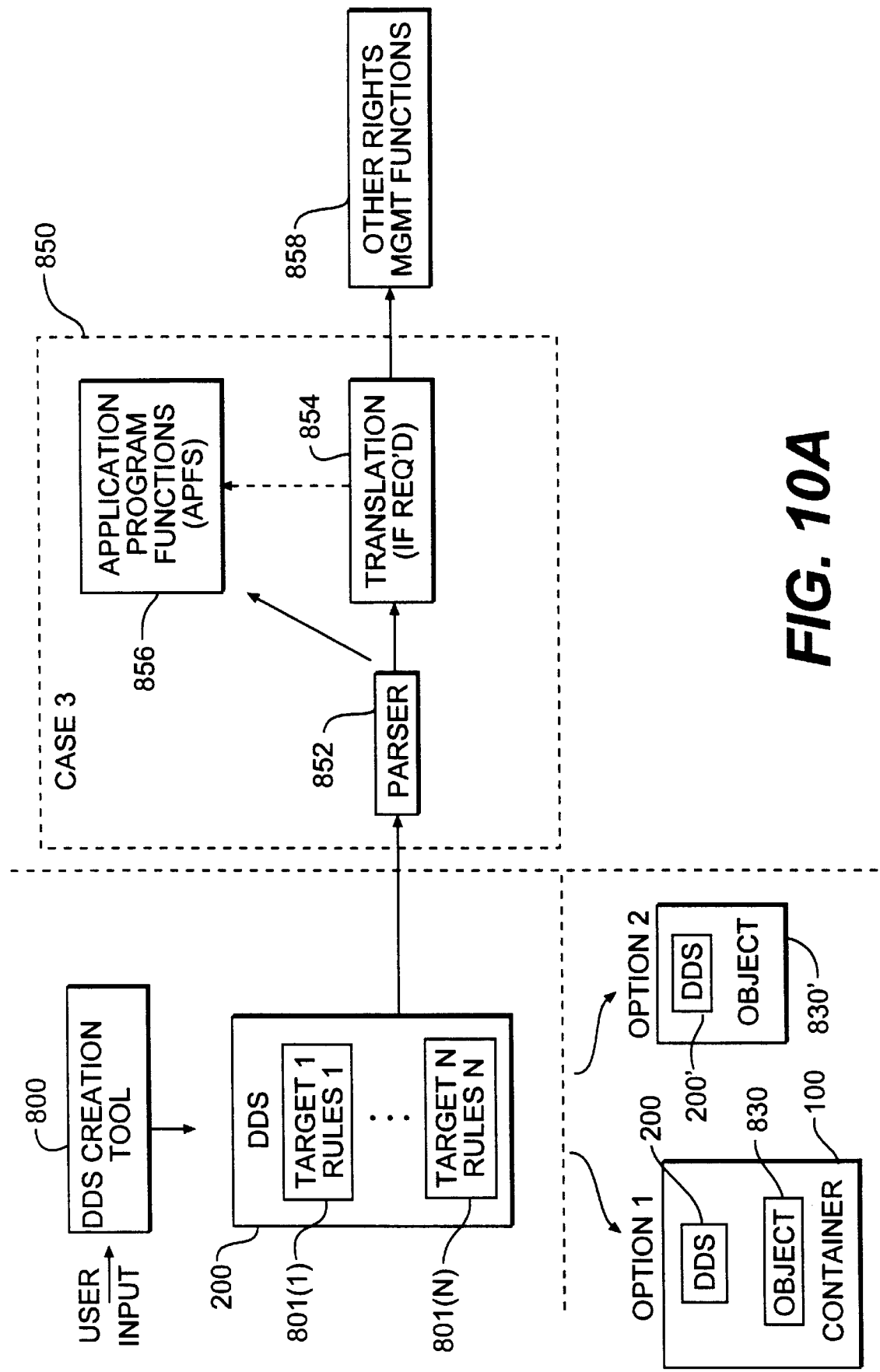
FIG. 10A shows an example use of descriptive data structures to provide interoperability between environments.

FIG. 10A shows an example of how descriptive data structures 200 may be used to provide interoperability. In the FIG. 10A example, a DDS creation tool 800 creates a DDS 200 that includes one or more target data blocks 801. In one example, the DDS creation tool 800 may be based on, and/or incorporate some or all of the capabilities of layout tool 300 and provide interoperability capabilities in addition to features associated with layout tool 300. In another example, DDS creation tool 800 may not incorporate any of the capabilities of layout tool 300, and may create DDS 200 solely for interoperability purposes. DDS creation tool 800 may, for example, be an application program with a graphical user interface, a background process that only displays a user interface when being configured by a user, a portion of an operating system, a portion of a computer's firmware, a server process that may act independently or as part or all of a "gateway" between one system and another (e.g., a public network and a private network, two or more private networks, a local area network and a wide area network, etc.), or any other desirable implementation or integration.

Target data block 801 may provide information used to provide interoperability with a particular target environment 850. A single DDS 200 can, in one example, provide interoperability with N different target environments 850 by including N target data blocks 801(1), . . . 801(N) each corresponding to a different target environment 850(1), . . . 850(N).

In this example, each target data block 801 includes rule (control) information. Different target data blocks 801 can provide different rule information for different target environments 850. The rule information may, for example, relate to operations (events) and/or consequences of application program functions 856 within the associated target environment 850 such as specifying:

permitted and/or required operations;

nature and/or extent of operations permitted and/or required operations; and/or consequences of performing permitted and/or required operations.

The target data block 801 may also include additional information if desired that gives directions to a DDS parser 852 and/or a translator 854 within a corresponding target environment 850.

Figure 10B:
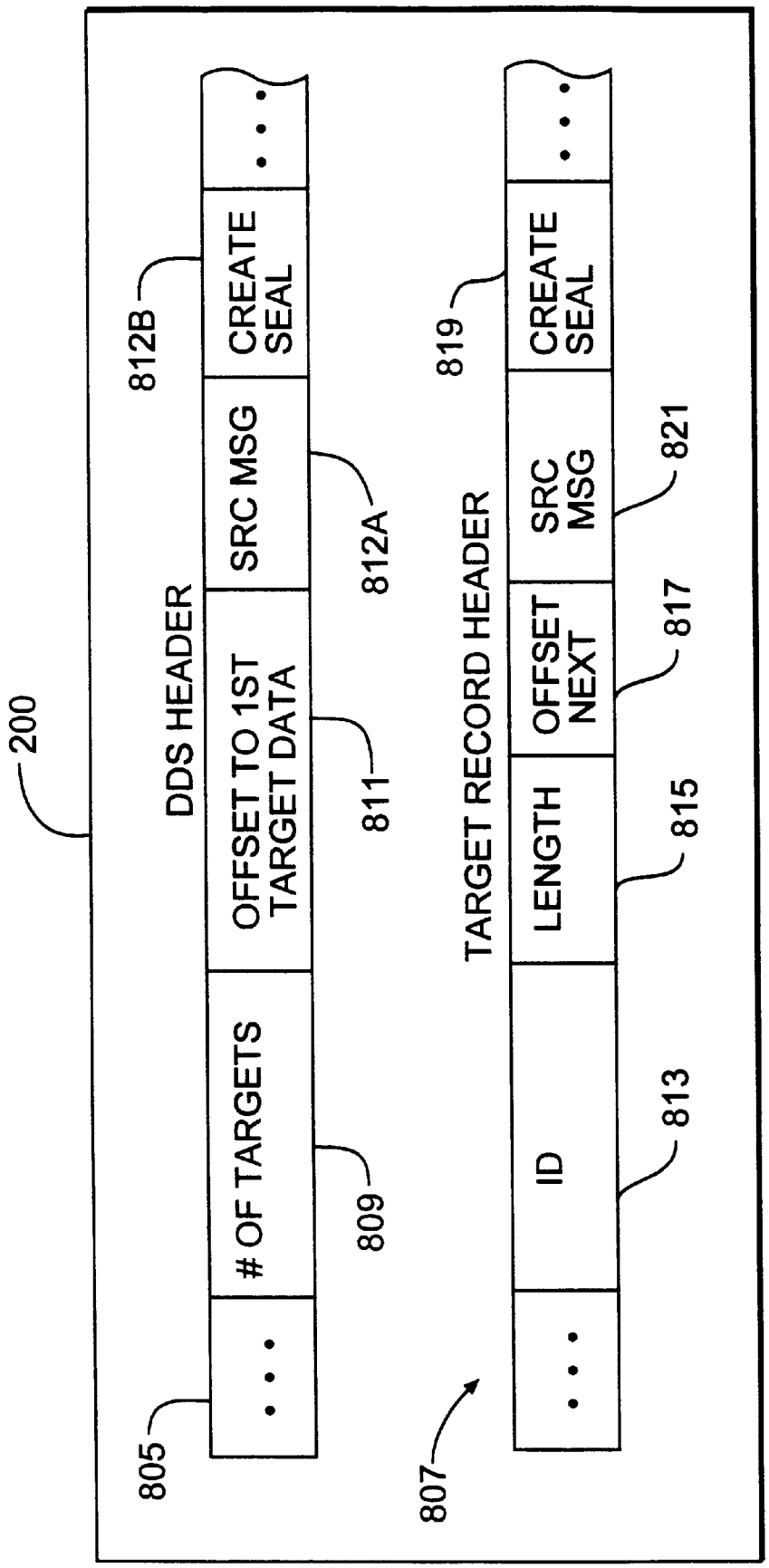
FIG. 10B provides more detail about how the FIG. 10A example descriptive data structure may be organized.

FIG. 10B shows one detailed example of how target information may be organized within DDS 200. In this example, DDS creation tool 800 creates a DDS header 805 that references one or more target record headers 807. DDS header 805 may, for example, include a "number of targets" field 809 indicating the number of target data blocks 801 within the DDS 200, a "offset to first target data portion" field 811 that provides the location of the first target data block 801 (1) within the DDS 200, a source message field 812A that identifies the source environment, and an optional creator seal 812B that may be used to verify the integrity and authenticity of the DDS 200. Source message field 812A (which can be optional) may include a source ID that may be used to help verify the source environment of DDS 200, and an optional source seal (that may or may not be present in the source message). Each target data block 801 within DDS 200 may begin with a target record header 807 including a "target ID" field 813, a "length" field 815, a "offset to next target data portion" field 817, an optional creator seal 819, and an optional source message 821. The "target ID" field 813 may specify a unique identification number or value corresponding to the associated target data block 801 and/or identifying the intended target environment(s), the "length" field 815 may specify the length of the target data block 801, and the "offset" field 817 may specify the location (relative or absolute) of the next target data block 801 within the DDS 200 (and may take on a null value for the last target data block).

The optional creator seals 812B, 819 (and source seals) may be cryptographic seals that help to ensure that the DDS 200 and target records 801, respectively, have not be altered since they were created, and also the identity of the DDS 200's creator and/or source. The optional source messages 812C and 821 may be information that helps to ensure that a target environment knows which source environment created DDS 200.

Referring again to FIG. 10A, DDS creation tool 800 may, upon creating the DDS 200, cryptographically seal it and each target data block 801 for integrity using appropriate cryptographic processes, for example by first running a cryptographic hash function (e.g., SHA, MD5, etc.) on the data and then encrypting the resulting hash value using a private key of the DDS creator associated with an asymmetric cryptosystem (e.g., RSA, E1 Gamal, etc.). If sealing is used, the DDS creator preferably should ensure that the public key associated with the encrypting private key is certified (e.g., encrypted with a private key of a certifying authority) and available for use by target environments to validate the seal (e.g., by including a certificate in DDS 200, publishing the certificate on a public network, etc.)

If source messages 812C, 821 are used, they should preferably represent information provided by the source environment that may help a target environment identify the source environment, and further may also help to ensure that the DDS 200 was actually created by the source environment (and therefore may, for example, be trusted to the extent that the source environment is trusted). For example, a source environment may have a protected processing environment (PPE) of the form described in the above referenced Ginter, et al. patent application. Certain of such PPEs may have cryptographic keys (e.g., a private key of a public key/private key pair) available that may be used to encrypt a cryptographic hash taken of the DDS header 805 or target block header 807, as appropriate. In such an example, a target environment would need to acquire a corresponding cryptographic key (e.g., a public key of a public key/private key pair) using trusted techniques (e.g., delivery in a certificate signed by a trusted certifying authority) in order to evaluate such a source message. In another example, DDS creation tool 800 may have been equipped with cryptographic keys when it was manufactured, and may use these cryptographic keys instead of keys from a PPE, although generally this technique would be more susceptible to tampering by an experienced computer hacker and might therefore be somewhat less trusted by target environments.

In addition, or alternatively (for example, if cryptographic techniques are not appropriate or desired), the source message may contain a unique identifier that corresponds to the source environment.

The DDS creation tool 800 (see FIG. 10A) may then package the resulting DDS 200 into a secure container 100 along with an associated object 830. In another example, DDS creation tool 800 may embed DDS 200 within, or otherwise associate the DDS with, an object 830' that provides a method for releasing the DDS to the target environment parser 852. The DDS 200 and its associated object 830 may then be delivered to one or more target environments 850 for processing.

Target environment parser 852 (and/or translator 854) may, for example, be part of an application program, part of an operating system, or part of a utility program used by, or in conjunction with, an application program and/or an operating system. The target environment parser 852 receives the DDS 200 and parses it to locate the target data block 801(k) corresponding to the target environment 850(k). Parser 852 may then determine, from the corresponding target data block 801, the rules the target data block contains. Parser 852 preferably understands enough about the structure of DDS 200 to find (e.g., using the header information shown in FIG. 10B) the appropriate target data block 801 corresponding to it, and also to understand the rules within the target data block. The target environment parser 852 doesn't need to understand any additional rules 316 that may be packaged within container 100 or otherwise delivered with object 830, but it may use any such additional rules if desired (e.g., when it finds no target data block 801 within DDS 200 for the particular target environment 850 (for example, if it is capable of understanding some other target data block 801 whose rules are based on a published specification and/or standard)).

The target environment parser 852 may obtain applicable target rules from target data block 801 and provide these rules to application program functions 856. Application program functions 856 may define any operation pertaining to object 830 such as for example:

cut
copy
print
paste
save
change
delete
any other operation.

The target rules provided by parser 852 may be used, for example, to permit, require and/or prevent certain operations; to define the extent to which certain operations can be performed (e.g., limit number of copies, define extent of cut, the rules that should be applied to cut information in subsequent use, etc.); and/or to define the consequences of performing a particular operation (e.g., charge the user for printing or otherwise using and/or accessing all or part of object 830, maintain records of the time and/or number of such operations performed, etc.).

Parser 852 may also, or alternatively, provide some or all of the rules it obtains from target data block 801 to other arrangements for applying the rules such as, for example, the "other rights management functions" block 858. Block 858 may provide any kind of rights management functions. Translator 854 may be used if needed to allow the application program functions 856 and/or the "other rights management" block 858 to understand the rules. As one example, translator 854 may be used to further elaborate, parameterize and/or secure the rule information obtained from target data block 801 so they are more or fully compatible with the "other rights management functions" block 858.

A useful data structure definitional method and arrangement has been described in connection with its most practical and presently preferred example embodiments. The present invention is not to be limited to those embodiments, but on the contrary, is intended to encompass variations and equivalents as defined within the spirit and scope of the claims.

We claim:

1. A distributed data processing arrangement including:
a first data processing apparatus including:
a central processing unit;
a first memory storing a descriptive data structure, said descriptive data structure including:
information regarding a first organization of elements within a secure container, said information including:
information on the organization of said elements within said secure container; and
information on the location of at least some of said elements within said secure container;
communications means by which said descriptive data structure may be communicated to a data processing apparatus different from said first data processing apparatus;
a second data processing apparatus located at a site different from the site of said first data processing apparatus, said second data processing apparatus including:
a central processing unit;
a second memory including:
a first secure container comprising at least:
data elements organized at least in part in accordance with the information contained in said descriptive data structure; and
at least one rule used to at least in part govern at least one aspect of access to or use of said data elements;
at least one of said rules requiring that information regarding at least one use of at least one of said data elements be at least temporarily recorded; and
at least one computer program designed to use at least a portion of said descriptive data structure in at least one operation on said first secure container or the contents of said first secure container;
said use including at least using said information regarding the organization of elements within said first secure container in a process of identifying and/or locating at least one of said elements; and
communications means by which said second data processing apparatus may receive at least a portion of said descriptive data structure or a copy thereof.

2. A distributed data processing arrangement as in claim 1 in which:
said application includes a browser that uses said information regarding the organization of elements within said first secure container to control, at least in part, the display of at least some information from said secure container.

3. A distributed data processing arrangement as in claim 1, in which:
said computer program is integrated into an operating system.

4. A distributed data processing arrangement as in claim 3, in which:
said operating system is compatible with at least one version of Microsoft Windows.

5. A distributed data processing arrangement as in claim 1, in which:
said descriptive data structure is contained within a second secure container;
said second secure container comprising at least:
said descriptive data structure; and
at least one rule governing at least in part at least one use of at least a portion of said descriptive data structure.

6. A distributed data processing arrangement as in claim 5, in which:
said computer program includes means for using said second container rule to govern at least one aspect of said computer program's use of said descriptive data structure.

7. A distributed data processing arrangement as in claim 6, further including:
metadata relating to the contents of said first secure container.

8. A distributed data processing arrangement as in claim 7, in which said metadata is stored in said second secure container.

9. A distributed data processing arrangement as in claim 7, in which said metadata is stored in a third secure container.

10. A distributed data processing arrangement as in claim 9, further including:
a third data processing apparatus, including:
a central processing unit;
a third memory including:
a third secure container including
said metadata; and
at least one rule used to at least in part govern at least one aspect of access to or use of said metadata; and
communications means by which said third data processing apparatus may communicate said third secure container, or a copy of said third secure container, to said second data processing apparatus.

11. A distributed data processing arrangement as in claim 1, in which:
said rules include at least one rule at least in part controlling at least one aspect of an auditing process.

12. A distributed data processing arrangement as in claim 1, in which:
said rules include at least one rule at least in part controlling at least one aspect of a budgeting process.

13. A distributed data processing arrangement as in claim 1, in which said second data processing apparatus includes a secure electronic appliance.

14. A method of using a descriptive data structure, at a first data processing arrangement located at a first site, said method comprising:
at a communications port of said first data processing arrangement, receiving a first secure container from a site remote from said first site, said first secure container comprising at least (a) content and (b) at least one rule designed to at least in part govern at least one use of or access to said content, said governance including at least a requirement that at least some information relating to said use or access be at least temporarily stored;
at said communications port, receiving a second secure container from a site remote from said first site, said second secure container comprising at least (a) a descriptive data structure including information at least in part describing or representing at least one aspect of the organization of said first secure container content; and (b) at least one rule designed to at least in part govern at least one use of or access to said descriptive data structure;

using said second container rule to gain access to at least a portion of said descriptive data structure; and using said descriptive data structure portion in the process of making at least one use of said first secure container content.

15. A method as in claim 14, in which:

said use of said descriptive data structure portion includes using information from said descriptive data structure relating to the organization of said first secure container content.

16. A method as in claim 15, in which:

said use of said descriptive data structure portion further includes using said organization information to identify a specific portion of said first secure container content.

17. A method as in claim 16, in which:

said specific portion of said first secure container contents includes information identifying or describing at least one additional portion of said first secure container contents; and said use of said descriptive data structure portion is followed by displaying said identification or description information.

18. A method as in claim 17, in which:

said first secure container contents identification or description information includes a title of said additional portion of said first secure container contents.

19. A method as in claim 17, in which:

said first secure container contents identification or description information includes a summary of said additional portion of said first secure container contents.

20. A method as in claim 16, in which:

said first data processing arrangement further includes a first computer program including a descriptive data structure interpreter; and said step of using said descriptive data portion includes said first computer program making said use.

21. A method as in claim 20, in which:

said first computer program includes a browser, and said step of using said descriptive data structure portion further includes
said browser using said descriptive data structure to identify and locate a portion of said first secure container content; and
said browser causing the display of said located first secure container content portion.

22. A method as in claim 21, in which:

said step of said browser using said descriptive data structure to identify and locate a portion of said first secure container content further includes said browser receiving an element identifier from said descriptive data structure, said element identifier identifying said first secure container content portion; and said step of said browser causing the display of said located first secure container content portion further includes said browser accessing said first secure container content portion using said element identifier.

23. A method as in claim 22, further comprising:

following said identification, using at least one rule from said first secure container rules to access said identified first secure container content portion.

24. A method as in claim 23, further comprising:

at said communications port, receiving a third secure container including (1) metadata related to said descriptive data structure; and (2) at least one rule designed to at least in part govern at least one use of or access to said metadata; and said step of using said descriptive data structure further including:
in said descriptive data structure, accessing a reference to said metadata;
using at least one rule from said third container to access at least a portion of said metadata; and
using said metadata in the process of using said descriptive data structure in connection with making said use of said third secure container contents.

25. A method as in claim 24, in which:

said step of using said metadata includes using information contained in said metadata to at least in part determine whether at least a portion of said first secure container content should be displayed to a user.

26. A method as in claim 25, wherein using said metadata includes:

the metadata includes information specifying that specified information must be displayed if some or all of said first secure container contents are displayed; and said step of using said metadata includes displaying the specified information.

27. A method as in claim 26, in which:

said specified information includes information identifying at least one owner or creator of at least a portion of said first secure container content.

28. A method as in claim 24, in which:

said first secure container is received from a second data processing arrangement; and said second secure container and said third secure container are received from a third data processing arrangement;

said second data processing arrangement and said third data processing arrangement being located at locations separate from each other, and each separate from the site at which said first data processing arrangement is located.

29. A method as in claim 14, in which:

said first secure container and said second secure container are received at said first data processing arrangement at different times.

30. A method as in claim 14, in which:

said first secure container is received from a second data processing arrangement; and said second secure container is received from a third data processing arrangement;

said second data processing arrangement and said third data processing arrangement being located at locations separate from each other, and each separate from the site at which said first data processing arrangement is located.

31. A method as in claim 14, in which:

said governance further includes at least in part controlling at least one aspect of an auditing process.

32. A method as in claim 14, in which:

said governance further includes at least in part controlling at least one aspect of a budgeting process.

33. A method as in claim 14, in which said first data processing arrangement includes a secure electronic appliance.

34. A descriptive data structure embodied on a computer-readable medium or other logic device including the following elements:

a representation of the format of data contained in a first rights management data structure
said representation including:
element information contained within said first rights management data structure; and
organization information regarding the organization of said elements within said first rights management data structure; and
information relating to metadata, said metadata including:
metadata rules used at least in part to govern at least one aspect of use and/or display of content stored within a rights management data structure,
said metadata rules including at least one rule specifying that information relating to at least one use or display of said content be recorded and/or reported.

35. A descriptive data structure as in claim 34, in which:
said first rights management data structure comprises a first secure container.

36. A descriptive data structure as in claim 35, in which:
said first secure container comprises:
said content; and
rules at least in part governing at least one use of said content.

37. A descriptive data structure as in claim 36, wherein the descriptive data structure is stored in said first secure container.

38. A descriptive data structure as in claim 36, in which:
said metadata is stored outside said descriptive data structure; and
said information relating to metadata includes information regarding the location at which said metadata is stored.

39. A descriptive data structure as in claim 38, in which:
said metadata is stored in a second secure container.

40. A descriptive data structure as in claim 36, in which:
said metadata includes at least one display rule at least in part governing the display of at least a portion of said content.

41. A descriptive data structure as in claim 40, in which:
said content includes source information at least in part identifying an author, creator, publisher and/or owner of at least a portion of said content; and
said metadata display rule requires display of said source information under circumstances specified by said metadata display rule.

42. A descriptive data structure as in claim 35, in which:
said metadata rules include at least one creation rule at least in part governing the creation of a specific example of said first secure container.

43. A descriptive data structure as in claim 42, in which:
said metadata creation rules include at least one rule at least in part specifying at least some information which must be included with said specific example of said first secure container when said specific example is created.

44. A descriptive data structure as in claim 34, further including:
a representation of the format of data contained in a second rights management data structure,
said second rights management data structure differing in at least one respect from said first rights management data structure.

45. A descriptive data structure as in claim 44, in which:
said information regarding elements contained within said first rights management data structure includes information relating to the location of at least one such element.

46. A descriptive data structure as in claim 44, further including:
a first target data block including information relating to a first target environment in which the descriptive data structure may be used.

47. A descriptive data structure as in claim 46, further including:
a second target data block including information relating to a second target environment in which the descriptive data structure may be used,
said second target environment differing in at least one respect from said first target environment.

48. A descriptive data structure as in claim 46, further including:
a source message field containing information at least in part identifying the source for the descriptive data structure.

49. A descriptive data structure as in claim 48, in which:
said source identification information includes information relating to at least one aspect of the source environment in which said descriptive data structure was at least in part created.

50. A descriptive data structure as in claim 49, in which:
said information relating to at least one aspect of said source environment includes information relating to security present at said source environment.

51. A descriptive data structure as in claim 49, in which:
said source message field further contains a source seal.

52. A descriptive data structure as in claim 51, in which:
said source seal is encrypted based on a private key present at said source environment.

53. A descriptive data structure as in claim 52, in which:
said source seal includes a hash of at least a portion of said descriptive data structure.

54. A descriptive data structure as in claim 52, further including:
information related to a certificate from which a public key corresponding to said private key may be obtained.

55. A descriptive data structure as in claim 52, in which:
said certificate is stored in said descriptive data structure.

56. A descriptive data structure as in claim 34, in which:
said metadata rules include at least one rule at least in part controlling at least one aspect of an auditing process.

57. A descriptive data structure as in claim 34, in which:
said metadata rules include at least one rule at least in part controlling at least one aspect of a budgeting process.

58. A method of creating a first secure container, said method including the following steps;
accessing a descriptive data structure, said descriptive data structure including or addressing
organization information at least in part describing a required or desired organization of a content section of said first secure container, and
metadata information at least in part specifying at least one step required or desired in creation of said first secure container;
using said descriptive data structure to organize said first secure container contents;
using said metadata information to at least in part determine specific information required to be included in said first secure container contents; and
generating or identifying at least one rule designed to control at least one aspect of access to or use of at least a portion of said first secure container contents.

59. A method as in claim 58, in which:

said descriptive data structure is contained in a second secure container, said second secure container governed by at least one rule at least in part governing at least one use of said descriptive data structure; and said step of accessing said descriptive data structure includes complying with said second secure container rule.

60. A method as in claim 59, in which:

said second secure container rule requires the communication of certain information to an external site; and said step of complying with said second secure container rule includes initiating and completing said required communication.

61. A method as in claim 60, in which:

said communicated information at least in part relates to the identity of the site at which said descriptive data structure is used in the process of creation of said first secure container and/or to the identity of a user at said site.

62. A method as in claim 59 in which said second secure container further includes said first secure container rule; and said step of generating or identifying said first secure container rule includes accessing said first secure container rule from said second secure container.

63. A method as in claim 58, further including:

using information contained in or addressed by said descriptive data structure to at least in part identify or generate at least one rule to govern at least one aspect of access to or use of said first secure container content.

64. A method as in claim 58, in which:

said creation of said first secure container occurs at a first data processing arrangement located at a first site;

said first data processing arrangement including a communications port; and said method further includes:

prior to said step of accessing said descriptive data structure, said first data processing arrangement receiving said descriptive data structure from a second data processing arrangement located at a second site, said receipt occurring through said first data processing arrangement communications port.

65. A method as in claim 64, in which:

said descriptive data structure is received at said first data processing arrangement in a second secure container, said second secure container being governed by at least one rule controlling at least in part one aspect of access to or use of at least a portion of said descriptive data structure; and said step of accessing includes complying with said second secure container rule in order to obtain such access.

66. A method as in claim 65, further including:

including a copy of said descriptive data structure in said first secure container.

67. A method as in claim 64, further comprising:

at said first processing site, receiving said metadata through said communications port.

68. A method as in claim 67, in which, said metadata is received separately from said descriptive data structure.

69. A method as in claim 68, in which:

said descriptive data structure includes a reference to said metadata, a process running at said first data processing arrangement accesses said reference, and said process requests delivery of said metadata;

said metadata being received through said first data processing arrangement communications port following said request.

70. A method as in claim 69, in which:

said metadata is received at said first data processing arrangement in a third secure container, said third secure container associated with at least one rule governing at least in part at least one aspect of access to or use of said third secure container; and said use of said metadata in the process of creation of said first secure container occurs after a process running on said first data processing arrangement has complied with at least one requirement imposed by said third secure container rule.

71. A method as in claim 58, in which:

said specific information required to be included includes information at least in part identifying at least one owner or creator of at least a portion of said first secure container contents.

72. A method as in claim 58, in which:

said specific information required to be included includes a copyright notice.

73. A method as in claim 58, in which:

said descriptive data structure organization information includes information specifying that said first secure container contents will include at least a title and a text section referred to by said title.

74. A method as in claim 73, in which:

said descriptive data structure organization information includes information specifying that said first secure container contents will include at least one advertisement.

75. A method as in claim 74, in which:

said descriptive data structure further includes information relating to the location at which said title, said text section and said advertisement should be stored in said first secure container.

76. A method as in claim 58, in which:

at least a portion of said descriptive data structure organization information includes information specifying fields relating to at least one atomic transaction.

77. A method as in claim 76, in which:

said atomic transaction information fields include fields for offer and acceptance information.

78. A method as in claim 60, in which:

said communicated information at least in part relates to a payment required for use of said descriptive data structure.

79. A method as in claim 58, in which:

said at least one rule at least in part controls at least one aspect of an auditing process.

80. A method as in claim 58, in which:

said at least one rule at least in part controls at least one aspect of a budgeting process.

81. A method as in claim 58, in which said method is carried out at least in part on a secure electronic appliance.

82. A method of using a descriptive data structure including:

at a first data processing arrangement of a value chain participant, receiving a descriptive data structure, said descriptive data structure including
a template for the organization of content in a secure container;
at said first data processing arrangement, creating a first secure container, said first secure container including:
content organized at least in part in accordance with said template; and
at least one rule designed to at least in part govern at least one access to or use of at least a portion of said content;
communicating said first secure container to a second data processing arrangement located at or associated with a downstream value chain participant; and
said downstream value chain participant opening said first secure container to retrieve at least a portion of said contents,
said opening step including complying with at least one requirement imposed by a first of said first container rule(s).

83. A method as in claim 82, in which:
said descriptive data structure is received at said first data processing arrangement in a second secure container;
said second secure container being associated with at least one rule governing at least in part at least one aspect of access to or use of at least a portion of said descriptive data structure; and
prior to said step of creating said first secure container, at least a portion of said descriptive data structure is accessed from said second secure container,
said access including complying with at least one requirement imposed by said second secure container rule.

84. A method as in claim 83, in which:
said first secure container further includes at least a portion of said descriptive data structure.

85. A method as in claim 83, in which:
said first secure container rule is at least in part specified by information in said descriptive data structure.

86. A method as in claim 85, in which:
said first secure container rule requires that at least one use of at least a portion of said first secure container content be directly or indirectly reported to a clearinghouse.

87. A method as in claim 86, in which:
said reporting includes a payment.

88. A method as in claim 87, further including:
prior to said step of receiving said descriptive data structure at said first data processing arrangement, communicating said descriptive data structure from a third data processing arrangement to said first data processing arrangement,
said third data processing arrangement being associated with at least one clearinghouse.

89. A method as in claim 88, further including:
prior to said step of communicating said descriptive data structure from said third data processing arrangement to said first data processing arrangement, said third data processing arrangement receiving said descriptive data structure from a fourth data processing arrangement;
said descriptive data structure being communicated from said fourth data processing arrangement to said third data processing arrangement in a third secure container, said third secure container including said descriptive data structure,
said third secure container being associated with at least one rule governing at least one aspect of access to or use of said descriptive data structure contained in said third secure container; and
prior to communication of said descriptive data structure from said third data processing arrangement to said first data processing arrangement, at least one process at said third data processing arrangement complying with at least one requirement imposed by said third secure container rule.

90. A method as in claim 89, in which:
said step of said third data processing arrangement complying with said at least one requirement includes said third data processing arrangement packaging said descriptive data structure into said second secure container, said packaging being at least in part governed by said third secure container rule.

91. A method as in claim 90, in which:
said step of said third data processing arrangement complying with said at least one requirement includes said third data processing arrangement associating at least one rule with said second secure container.

92. A method as in claim 91, in which:
said descriptive data structure includes information relating to organization of data relating to a transaction,
said information including information regarding price.

93. A method as in claim 82, in which:
a second of said first container rules at least in part controls at least one aspect of an auditing process.

94. A method as in claim 82, in which:
a second of said first container rules at least in part controls at least one aspect of a budgeting process.

95. A method as in claim 82, in which said second data processing arrangement includes a secure electronic appliance.

96. A data processing system including:
a first data processing arrangement including:
means for creating a first descriptive data structure, said first descriptive data structure including:
information relating to the organization of data in a first secure container; and
information relating to at least one attribute of said first data processing arrangement;
said information including information relating to the level of security present at said first data processing arrangement;
means for communicating said first descriptive data structure to a second data processing arrangement;
a second data processing arrangement including:
means for receiving said first descriptive data structure from said first data processing arrangement;
means for receiving said first secure container;
means for accessing at least a portion of said descriptive data structure; and
means for using said first data processing arrangement attribute information in determining at least one use to be made of at least a portion of said first secure container.

97. A system as in claim 96, in which:
said second data processing arrangement means for using said first data processing arrangement attribute information includes
means for identifying at least one attribute of the security present at said first data processing arrangement; and
means for using said security information at least in part to specify at least one operation involving said first secure container.

98. A system as in claim 97, in which:
said first descriptive data structure includes a first target data block,
said first target data block containing information designed for a first target environment; and
said second data processing arrangement includes means for identifying and using said first target data block.

99. A system as in claim 98, in which:
said first descriptive data structure includes a second target data block;
said second target data block containing information designed for a second target environment which differs in at least one respect from said first target environment; and
said second data processing arrangement includes said first target environment but not said second target environment.

100. A system as in claim 99, in which:
said first target environment and said second target environment are incompatible in at least one respect.

101. A system as in claim 96, in which said first data processing arrangement includes a secure electronic appliance.

* * * * *

UNITED STATES PATENT AND TRADEMARK OFFICE
CERTIFICATE OF CORRECTION

PATENT NO. : 5,920,861
APPLICATION NO. : 08/805804
DATED : July 6, 1999
INVENTOR(S) : Hall et al.

It is certified that error appears in the above-identified patent and that said Letters Patent is hereby corrected as shown below:

In the Claims

Column 21, In claim 1, lines 31-34, the paragraph "at least one of said rules requiring that information regarding at least one use of at least one of said data elements be at least temporarily recorded; and" should be indented four tab stops from the left margin instead of three.

Column 21, In claim 1, lines 35-39, the paragraph "at least one computer program designed to use at least a portion of said descriptive data structure in at least one operation on said first secure container or the contents of said first secure container;" should be indented two tab stops from the left margin instead of three.

Column 26, In claim 55, line 41, please change "as in claim 52" to --as in claim 54--.

Column 29, In claim 82, lines 11-16, the two paragraphs "communicating said first secure container to a second data processing arrangement located at or associated with a downstream value chain participant; and" and "said downstream value chain participant opening said first secure container to retrieve at least a portion of said contents," should not be indented from the left margin.

Column 29, In claim 82, lines 17-19, the paragraph "said opening step including complying with at least one requirement imposed by a first of said first container rule(s)." should be indented one tab stop from the left margin instead of two.

Column 29, In claim 83, lines 27-29, the paragraph "prior to said step of creating said first secure container, at least a portion of said descriptive data structure is accessed from said second secure container," should not be indented from the left margin.

Column 29, In claim 83, lines 30-32, the paragraph "said access including complying with at least one requirement imposed by said second secure container rule." should be indented one tab stop from the left margin instead of two.

Signed and Sealed this
Ninth Day of February, 2016

Michelle K. Lee
*Director of the United States Patent and Trademark Office*